US012639900B2

(12) United States Patent
Cocchiarella et al.

(10) Patent No.: US 12,639,900 B2
(45) Date of Patent: May 26, 2026

(54) DISPLAYING AN AUGMENTED REALITY ELEMENT THAT PROVIDES A PERSONALIZED ENHANCED EXPERIENCE AT A WAREHOUSE

(71) Applicant: Maplebear Inc., San Francisco, CA (US)

(72) Inventors: Dominic Cocchiarella, Berkeley, CA (US); Aditya Godbole, San Francisco, CA (US); Andrew Peters, Tiburon, CA (US); Spencer Schack, Seattle, WA (US); Brandon Leonardo, Redwood City, CA (US)

(73) Assignee: Maplebear Inc, San Francisco, CA (US)

( * ) Notice: Subject to any disclaimer, the term of this patent is extended or adjusted under 35 U.S.C. 154(b) by 0 days.

(21) Appl. No.: 18/674,458

(22) Filed: May 24, 2024

(65) Prior Publication Data

US 2024/0312160 A1     Sep. 19, 2024

Related U.S. Application Data

(63) Continuation of application No. 17/877,676, filed on Jul. 29, 2022, now Pat. No. 12,020,388.

(51) Int. Cl.
G06T 19/00          (2011.01)
G06Q 30/0601     (2023.01)

(52) U.S. Cl.
CPC ....... G06T 19/006 (2013.01); G06Q 30/0627 (2013.01); G06Q 30/0629 (2013.01); G06Q 30/0631 (2013.01); G06Q 30/0643 (2013.01)

(58) Field of Classification Search
None
See application file for complete search history.

(56) References Cited

U.S. PATENT DOCUMENTS

| | | | | |
|---|---|---|---|---|
| 8,743,145 B1 * | 6/2014 | Price | ................... | G06F 16/9535 |
| | | | | 345/631 |
| 10,559,019 B1 * | 2/2020 | Beauvais | ........... | G06Q 30/0625 |
| 11,282,133 B2 * | 3/2022 | Greenberger | ...... | G02B 27/0172 |

(Continued)

OTHER PUBLICATIONS

PCT International Search Report and Written Opinion, PCT Application No. PCT/US22/50006, Feb. 22, 2023, 8 pages.

(Continued)

*Primary Examiner* — Jason A Pringle-Parker
(74) *Attorney, Agent, or Firm* — Fenwick & West LLP

(57)                    ABSTRACT

An augmented reality application executing on a client device receives video data captured by a camera of the device, in which the video data includes a display area of the device. The application detects a set of items within the display area based on the video data, wherein the set of items is included among an inventory of a warehouse associated with a retailer, and accesses a set of attributes of each item. The application retrieves profile information including a set of preferences associated with a customer of the retailer, matches one or more of the set of preferences with one or more attributes of each item, and generates an augmented reality element based on the matches. The augmented reality element is then displayed, such that it is overlaid onto a portion of the display area based on a location within the display area at which the items are detected.

20 Claims, 11 Drawing Sheets

(56)                References Cited

U.S. PATENT DOCUMENTS

| | | | | |
|---|---|---|---|---|
| 11,328,334 | B1 * | 5/2022 | Ethington | G06V 20/52 |
| 2006/0038833 | A1 * | 2/2006 | Mallinson | G06F 1/1686 |
| | | | | 345/633 |
| 2013/0346168 | A1 * | 12/2013 | Zhou | G06F 1/163 |
| | | | | 701/428 |
| 2014/0100994 | A1 * | 4/2014 | Tatzel | G06Q 30/0276 |
| | | | | 705/27.1 |
| 2014/0291396 | A1 * | 10/2014 | Molisimo | G07G 1/0063 |
| | | | | 235/383 |
| 2014/0304122 | A1 * | 10/2014 | Rhoads | G06Q 30/0643 |
| | | | | 705/27.2 |
| 2015/0170256 | A1 * | 6/2015 | Pettyjohn | G06Q 30/0603 |
| | | | | 705/26.9 |
| 2015/0262116 | A1 * | 9/2015 | Katircioglu | G06Q 10/087 |
| | | | | 705/28 |
| 2015/0339860 | A1 * | 11/2015 | Endo | G06T 19/006 |
| | | | | 345/633 |
| 2016/0071149 | A1 * | 3/2016 | Farshori | G06T 19/006 |
| | | | | 705/14.51 |
| 2017/0039613 | A1 * | 2/2017 | Kaehler | G06T 19/006 |
| 2017/0249693 | A1 * | 8/2017 | Greenwood | G06T 19/003 |
| 2018/0150903 | A1 * | 5/2018 | Waldron | G06F 3/011 |
| 2018/0322706 | A1 * | 11/2018 | Drouin | G06F 3/011 |
| 2018/0341811 | A1 * | 11/2018 | Bendale | G06V 20/70 |
| 2019/0228854 | A1 * | 7/2019 | Jain | G06Q 30/0281 |
| 2019/0244436 | A1 | 8/2019 | Stansell et al. | |
| 2020/0053262 | A1 * | 2/2020 | Wexler | G06V 20/30 |
| 2020/0334731 | A1 * | 10/2020 | Abdollahian | G06F 3/017 |
| 2020/0380591 | A1 | 12/2020 | Rule et al. | |
| 2021/0133850 | A1 | 5/2021 | Ayush et al. | |
| 2024/0029014 | A1 * | 1/2024 | Choura | G16H 20/60 |

OTHER PUBLICATIONS

United States Office Action, U.S. Appl. No. 17/877,676, Nov. 6, 2023, 15 pages.

* cited by examiner

200

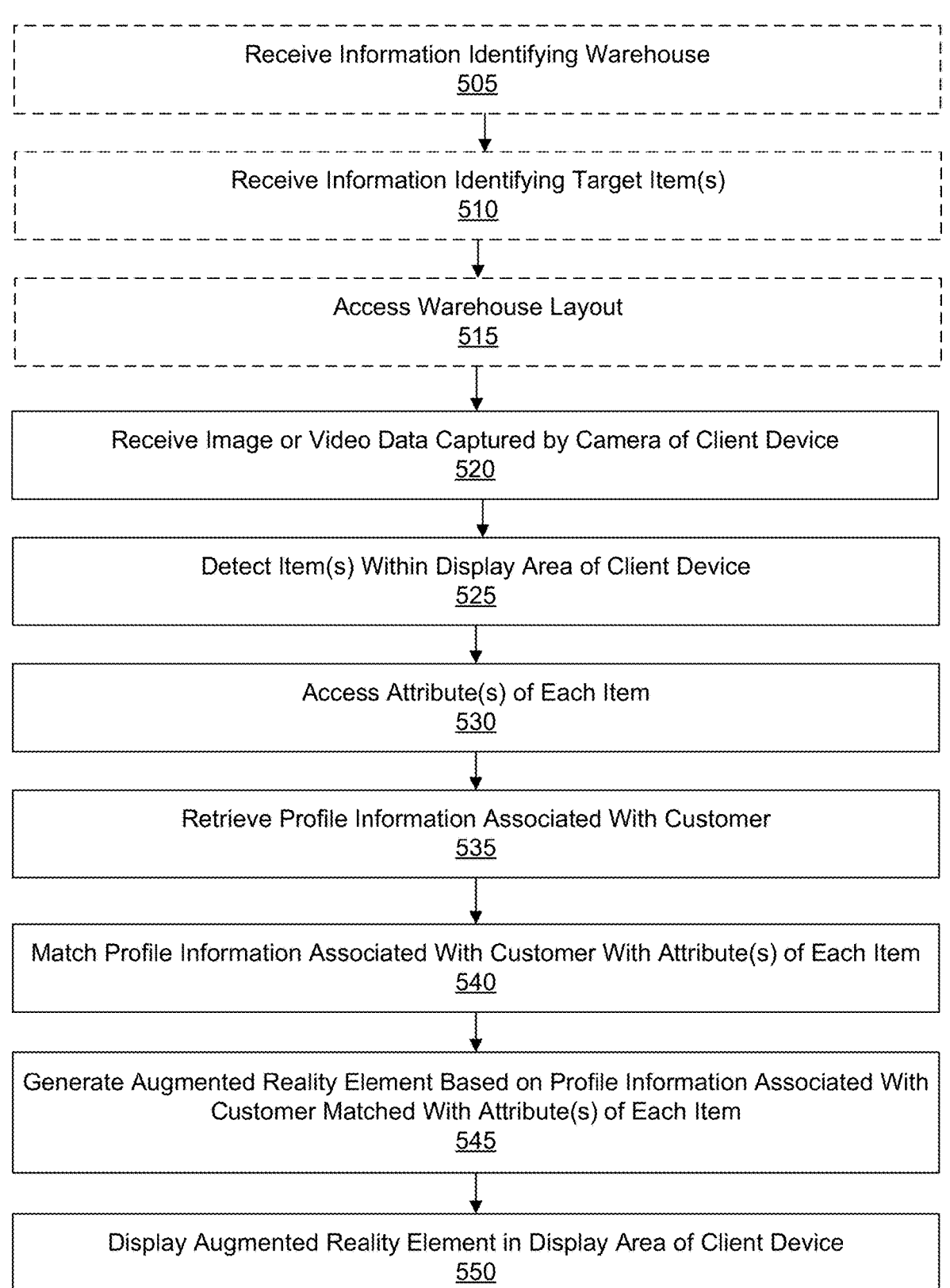

Receive Information Identifying Warehouse
505

Receive Information Identifying Target Item(s)
510

Access Warehouse Layout
515

Receive Image or Video Data Captured by Camera of Client Device
520

Detect Item(s) Within Display Area of Client Device
525

Access Attribute(s) of Each Item
530

Retrieve Profile Information Associated With Customer
535

Match Profile Information Associated With Customer With Attribute(s) of Each Item
540

Generate Augmented Reality Element Based on Profile Information Associated With Customer Matched With Attribute(s) of Each Item
545

Display Augmented Reality Element in Display Area of Client Device
550

FIG. 5

DISPLAYING AN AUGMENTED REALITY ELEMENT THAT PROVIDES A PERSONALIZED ENHANCED EXPERIENCE AT A WAREHOUSE

CROSS REFERENCE TO RELATED APPLICATIONS

This application is a continuation of U.S. application Ser. No. 17/877,676, filed Jul. 29, 2022, which is incorporated by reference in its entirety.

BACKGROUND

This disclosure relates generally to computer hardware and software for displaying an augmented reality element and more specifically to computer hardware and software for displaying an augmented reality element that provides a personalized enhanced experience at a warehouse.

To provide their customers with options to suit their personal needs and tastes, retailers associated with warehouses, such as grocery stores, discount stores, department stores, and other physical retail stores, typically provide a wide variety of items included among their inventory available for purchase. These items may vary by type, brand, size, quality, model/version, materials, colors, textures, etc. For example, a grocery store may carry several brands of milk of various types (e.g., cow milk, goat milk, soy milk, oat milk, almond milk, coconut milk, etc.) and varieties (e.g., whole milk, low-fat milk, non-fat milk, lactose-free milk, sweetened, unsweetened, organic, vanilla flavored, chocolate flavored, etc.).

However, due to the wide variety of items included among the inventories of warehouses, customers, as well as shoppers who may be fulfilling orders on behalf of customers using online concierge systems, may have difficulty finding or selecting items based on the customers' preferences. This may be especially important for customers who have strong preferences for certain types of items. For example, since a customer who is a vegetarian is unlikely to be interested in any food items containing animal products, the customer, or a shopper fulfilling an order on behalf of the customer, may have to read the labels of several food items before identifying the vegetarian options. Additionally, customers and/or shoppers may be more likely to make mistakes when collecting items if they have a larger selection of items from which to choose. In the above example, if vegetarian and non-vegetarian versions of an item look very similar and the customer is in a hurry or the shopper is unfamiliar with the item, the customer or shopper may accidentally collect the non-vegetarian version of the item.

Furthermore, customers or shoppers may have to evaluate items based on different factors that may vary in importance for different customers, which may be a time-consuming process. For example, a first customer who is on a specific diet may prefer vegetarian food items that are low in sugar, low in sodium, and organic, while a second customer who is on a different diet and closely follows a budget may prefer food items that are low in fat and provide the best value for their money. In the above example, to select an item, the first customer may have to read through the ingredients list and nutritional information for each item they are considering, while the second customer may have to read through the nutritional information and perform price calculations for each item they are considering.

SUMMARY

Retailers associated with warehouses typically provide a wide variety of items included among their inventory available for purchase to provide their customers with options to suit their personal needs and tastes. These items may vary by type, brand, size, quality, model/version, materials, colors, textures, etc. But due to the wide variety of items included among the inventories of warehouses, customers, as well as shoppers who may be fulfilling orders on behalf of customers using online concierge systems, may have difficulty finding or selecting items based on the customers' preferences, which may be especially important for customers who have strong preferences for certain types of items. Additionally, customers and shoppers are more likely to make mistakes when collecting items if they have a larger selection of items from which to choose. Furthermore, customers or shoppers may have to evaluate items based on different factors that may vary in importance for different customers, which may be a time-consuming process.

To help customers and shoppers fulfilling orders on behalf of customers find and select items based on the customers' preferences, an augmented reality application executing on a client device displays an augmented reality element that provides a personalized enhanced experience at a warehouse, in accordance with one or more aspects of the disclosure. More specifically, the augmented reality application receives video data captured by a camera of the client device, in which the video data includes a display area of the client device. The augmented reality application detects a set of items within the display area based on the video data, in which the set of items is included among an inventory of a warehouse associated with a retailer, and accesses a set of attributes of each item included among the set of items. The augmented reality application retrieves profile information associated with a customer of the retailer, in which the profile information includes a set of preferences associated with the customer. The augmented reality application then matches one or more of the set of preferences with one or more attributes of each item included among the set of items and generates an augmented reality element based on the matches. The augmented reality element is then displayed within the display area of the client device, such that it is overlaid onto a portion of the display area based on a location within the display area at which the set of items is detected.

BRIEF DESCRIPTION OF THE DRAWINGS

FIG. 5 is a flowchart of a method for displaying an augmented reality element that provides a personalized enhanced experience at a warehouse, according to one or more embodiments.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Architecture

Figure 1:
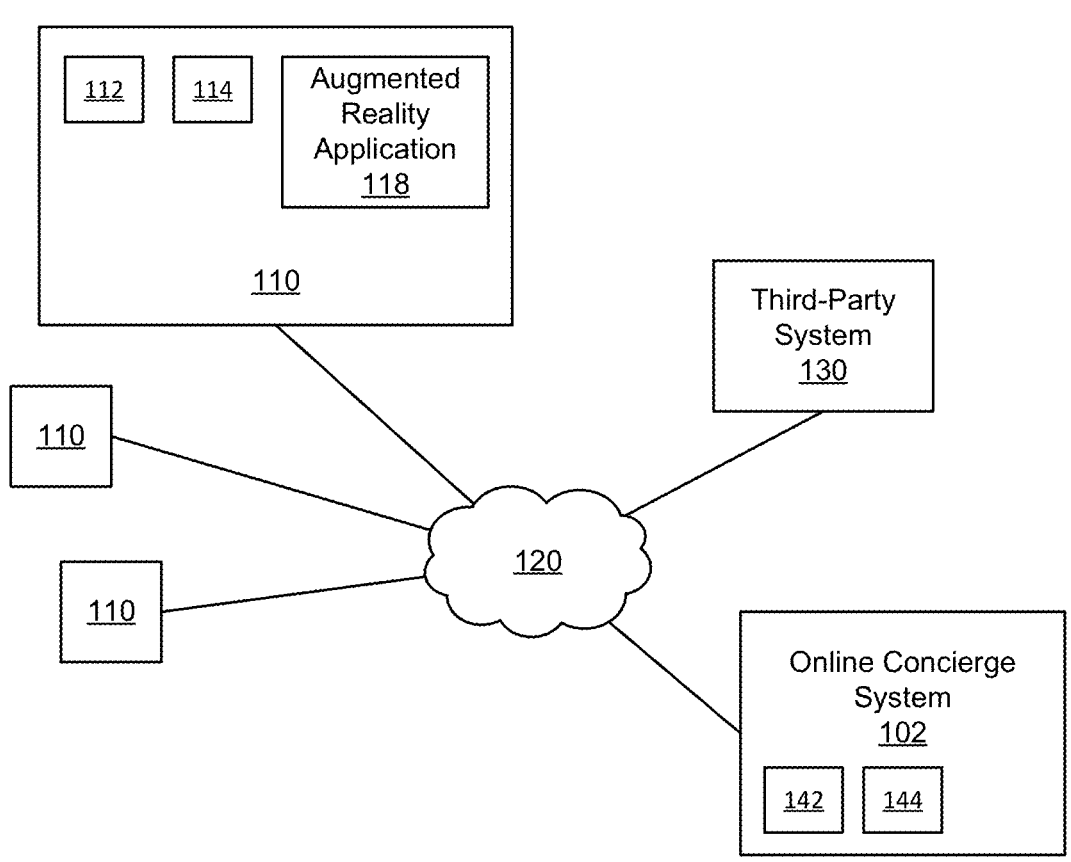
FIG. 1 is a block diagram of a system environment in which an online system, such as an online concierge system, and an application, such as an augmented reality application, operate, according to one or more embodiments.

FIG. 1 is a block diagram of a system environment 100 in which an online system, such as an online concierge system 102 as further described below in conjunction with FIGS. 2 and 3A, and an application, such as an augmented reality application 118 as further described below in conjunction with FIGS. 2 and 3B, operate. The system environment 100 shown in FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, an augmented reality device, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As an additional example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing various functions. In various embodiments, a client device 110 includes a memory 114 comprising a non-transitory storage medium on which instructions are encoded. The memory 114 may have instructions encoded thereon that, when executed by the processor 112, cause the processor 112 to perform functions to execute the customer mobile application 206 or the shopper mobile application 212 to provide the functions further described below in conjunction with FIGS. 4A and 4B, respectively. In some embodiments, the memory 114 also or alternatively may have instructions encoded thereon corresponding to the modules further described below in conjunction with FIG. 3B that, when executed by the processor 112, cause the processor 112 to perform the functionality further described below in conjunction with FIGS. 2 and 5-6E. For example, the memory 114 has instructions encoded thereon that, when executed by the processor 112, cause the processor 112 to display an augmented reality element that provides a personalized enhanced experience at a warehouse. In various embodiments, the augmented reality application 118 may be configured to access information associated with a client device 110 and/or components of the client device 110 (e.g., a camera, a display area, etc.). For example, the augmented reality application 118 may access location information (e.g., GPS coordinates) associated with a client device 110 and image or video data captured by a camera of the client device 110. In some embodiments, the augmented reality application 118 may be replaced by an application configured to retrieve content for display to users and to transmit the content to one or more client devices 110 for display.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online concierge system 102 or with the client devices 110. In one embodiment, a third-party system 130 is an application provider communicating information describing applications for execution by a client device 110 or communicating data to client devices 110 for use by an application executing on the client device 110. In other embodiments, a third-party system 130 provides content or other information for presentation via a client device 110. For example, a third-party system 130 stores one or more web pages and transmits the web pages to a client device 110 or to the online concierge system 102. A third-party system 130 may also communicate information to the online concierge system 102, such as advertisements, content, or information about an application provided by the third-party system 130.

The online concierge system 102 includes one or more processors 142 configured to control operation of the online concierge system 102 by performing various functions. In various embodiments, the online concierge system 102 includes a memory 144 comprising a non-transitory storage medium on which instructions are encoded. The memory 144 may have instructions encoded thereon corresponding to the modules further described below in conjunction with FIG. 3A that, when executed by the processor 142, cause the processor 142 to perform the functionality further described below in conjunction with FIGS. 2 and 5-6E. For example, the memory 144 has instructions encoded thereon that, when executed by the processor 142, cause the processor 142 to display an augmented reality element that provides a personalized enhanced experience at a warehouse. Additionally, the online concierge system 102 includes a communication interface configured to connect the online concierge system 102 to one or more networks, such as network 120, or to otherwise communicate with devices (e.g., client devices 110) connected to the networks. In various embodiments, the online concierge system 102 may be configured to access information associated with a client device 110 and/or components of the client device 110 (e.g., a camera, a display area, etc.). For example, the online concierge system 102 may access location information (e.g., GPS coordinates) associated with a client device 110 and image or video data captured by a camera of the client device 110.

One or more of a client device 110, a third-party system 130, or the online concierge system 102 may be special-purpose computing devices configured to perform specific functions, as further described below in conjunction with FIGS. 2-6E, and may include specific computing components such as processors, memories, communication interfaces, and/or the like.

System Overview

Figure 2:
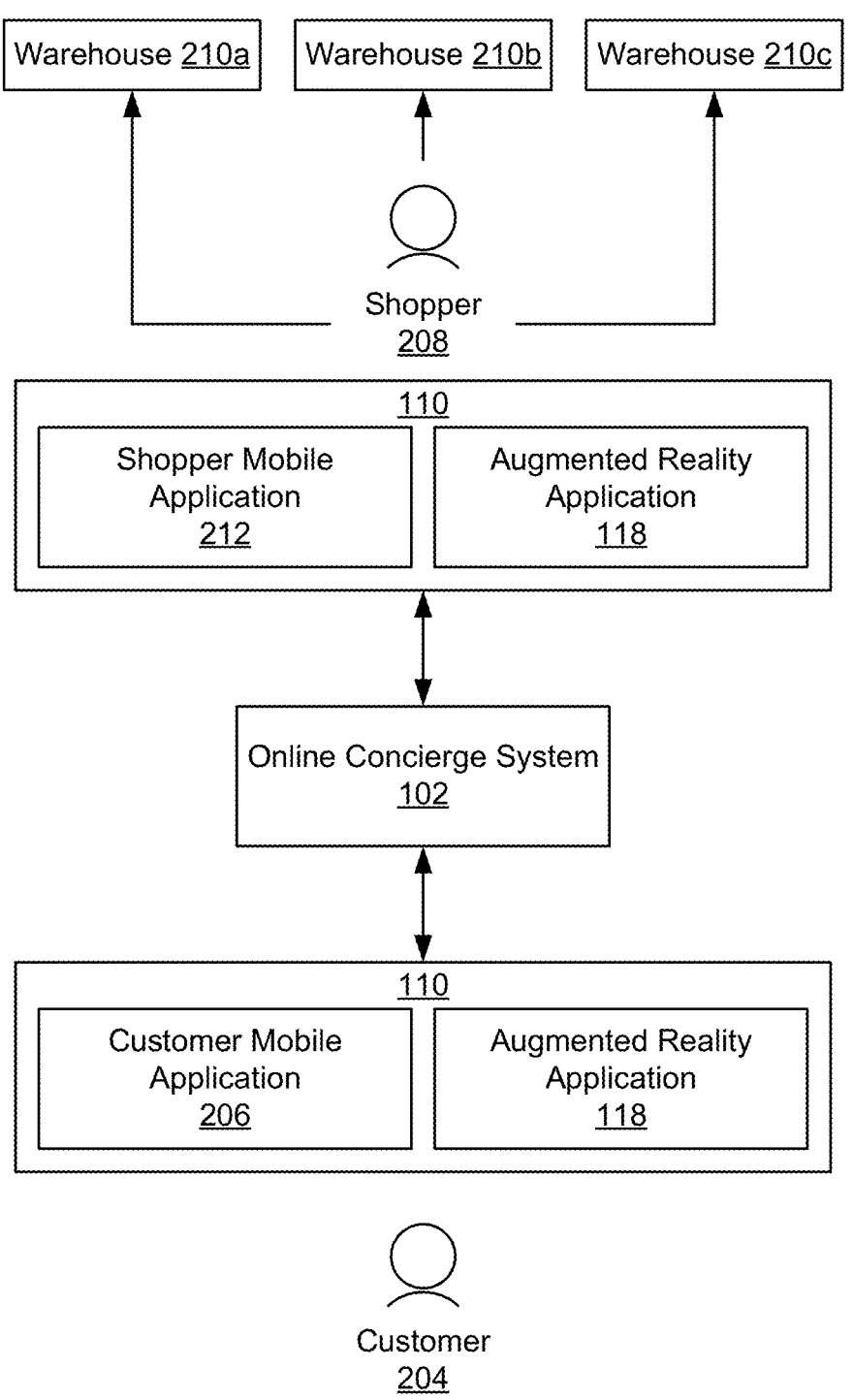
FIG. 2 illustrates an environment of an online concierge system and an augmented reality application, according to one or more embodiments.

FIG. 2 illustrates an environment 200 of an online platform, such as an online concierge system 102, and an application, such as an augmented reality application 118, according to one or more embodiments. The figures use like reference numerals to identify like elements. A letter after a reference numeral, such as "210*a*," indicates that the text refers specifically to the element having that particular reference numeral. A reference numeral in the text that is not followed by a letter, such as "210," refers to any or all of the elements in the figures bearing that reference numeral. For example, "210" in the text may refer to reference numerals "210*a*," "210*b*," and/or "210*c*" in the figures.

The environment 200 includes an online concierge system 102. The online concierge system 102 is configured to receive orders from one or more customers 204 (only one is shown for the sake of simplicity). An order specifies a list of goods (items or products) to be delivered to a customer 204. An order also specifies a location to which goods are to be delivered, and a time window during which the goods should be delivered. In some embodiments, an order specifies one or more retailers from which goods should be purchased. A customer 204 may use a customer mobile application (CMA) 206, which is configured to communicate with the online concierge system 102, to place an order.

The online concierge system 102 is configured to transmit orders received from customers 204 to one or more shoppers 208. A shopper 208 may be a person (e.g., a contractor, an employee, etc.), an entity, or an autonomous device (e.g., a robot) enabled to fulfill orders received by the online concierge system 102. A shopper 208 travels between a warehouse 210 and a delivery location (e.g., a customer's home or office) and may do so by car, truck, bicycle, scooter, foot, or via any other mode of transportation. In some embodiments, a delivery may be partially or fully automated, e.g., using a self-driving car. The environment 200 also includes three warehouses 210*a*, 210*b*, and 210*c* (while only three are shown for the sake of simplicity, the environment 200 may include hundreds of warehouses 210). The warehouses 210 may be physical retailers, such as grocery stores, discount stores, department stores, etc., or non-public warehouses 210 storing items that may be collected and delivered to customers 204. Each shopper 208 fulfills an order received from the online concierge system 102 at one or more warehouses 210, delivers the order to a customer 204, or performs both fulfillment and delivery. In one embodiment, shoppers 208 make use of a shopper mobile application 212 which is configured to interact with the online concierge system 102.

As described above, the augmented reality application 118 is configured to display an augmented reality element that provides a personalized enhanced experience at a warehouse 210. The augmented reality application 118 may be executed on a client device 110 associated with a shopper 208 fulfilling an order on behalf of a customer 204. Alternatively, the augmented reality application 118 may be executed on a client device 110 associated with a customer 204 of a retailer associated with a warehouse 210, in which the customer 204 may or may not be associated with the online concierge system 102. For example, the augmented reality application 118 may be executed on a client device 110 associated with a customer 204 of a retailer associated with a warehouse 210, in which the customer 204 is doing their own shopping at the warehouse 210 and may or may not be associated with the online concierge system 102. In various embodiments, the augmented reality application 118 may interact with the online concierge system 102, the CMA 206, and/or the SMA 212, while in other embodiments, the augmented reality application 118 is a standalone application. In some embodiments, the online concierge system 102 is configured to perform some or all of the functionality described below in conjunction with FIG. 3A, while in other embodiments, the augmented reality application 118 is configured to perform some or all of the functionality described below in conjunction with FIG. 3B.

Figure 3A:
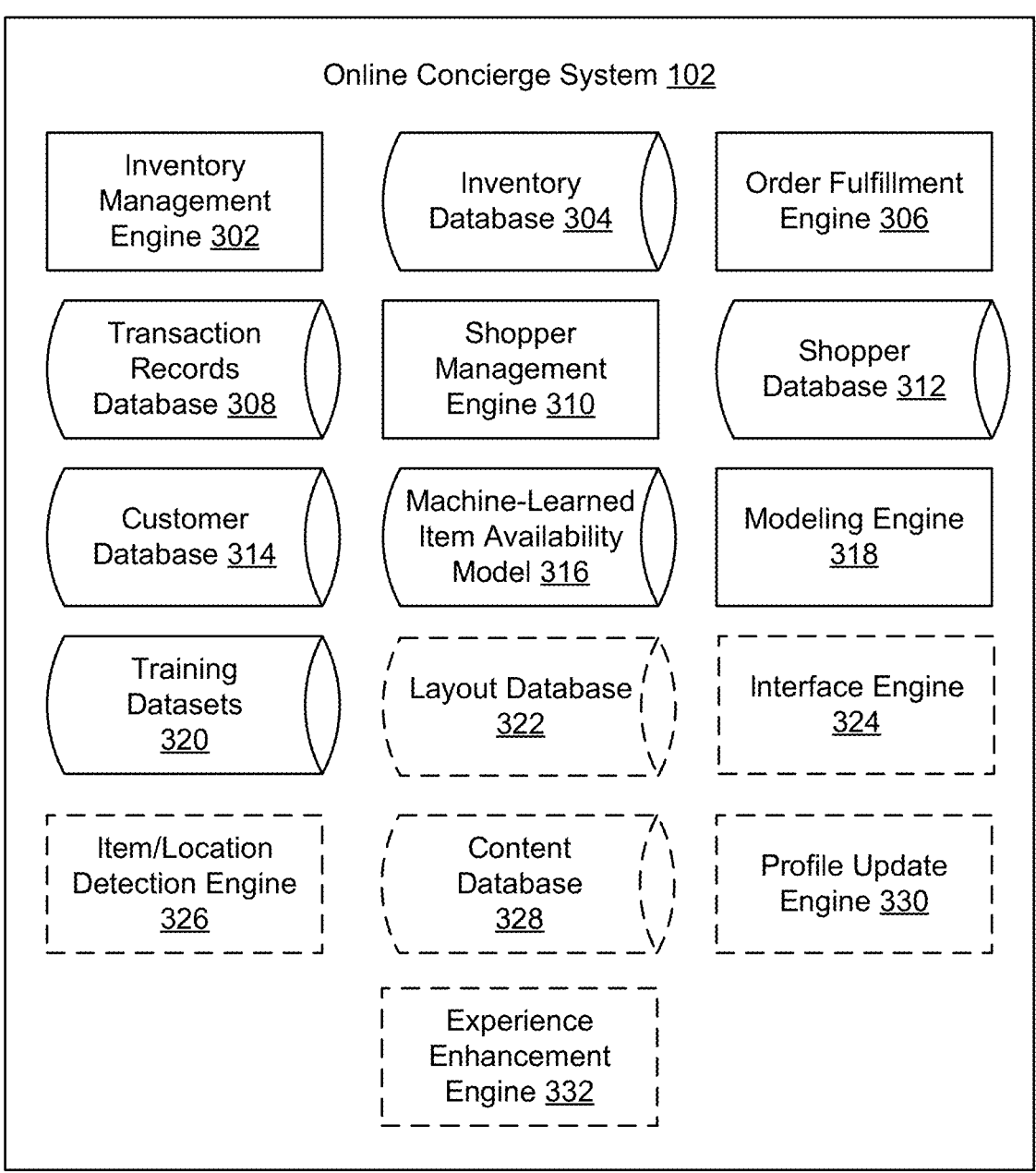
FIG. 3A is a diagram of an online concierge system, according to one or more embodiments.

FIG. 3A is a diagram of an online concierge system 102, according to one or more embodiments. In various embodiments, the online concierge system 102 may include different or additional modules than those described in conjunction with FIG. 3A. Furthermore, in some embodiments, the online concierge system 102 includes fewer modules than those described in conjunction with FIG. 3A.

The online concierge system 102 includes an inventory management engine 302, which interacts with inventory systems associated with each warehouse 210. In one embodiment, the inventory management engine 302 requests and receives inventory information maintained by a warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and quantitative information about the items, including size, color, weight, SKU, serial number, etc. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse 210), the inventory database 304 may store a time that the item was last found, a time that the item was last not found (e.g., if a shopper 208 looked for the item but could not find it), a rate at which the item is found, and a popularity of the item. In some embodiments, the inventory management engine 302 receives an item catalog from a warehouse 210 identifying items offered for purchase by the warehouse 210. In such embodiments, one or more images of each item included in the item catalog may be stored in the inventory database 304 in association with various types of information (e.g., information identifying the item and the warehouse 210, a date the catalog was received, etc.).

For each item, the inventory database 304 identifies one or more attributes of the item and corresponding values for each attribute of the item. For example, the inventory database 304 includes an entry for each item offered by a warehouse 210, in which an entry for an item includes an item identifier that uniquely identifies the item. The entry includes different fields, with each field corresponding to an attribute of the item. A field of an entry includes a value for an attribute corresponding to the field, allowing the inventory database 304 to maintain values of different attributes for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210, in which different levels of the taxonomy provide different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.) with the category. Thus, the taxonomy maintains associations between a category and specific items offered by the warehouse 210 matching the category. In some embodiments, different levels of the taxonomy identify items with differing levels of specificity based on any suitable attribute or combination of attributes of the items. For example, different levels of the taxonomy specify different combinations of attributes of items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels of the taxonomy include fewer details about items, so greater numbers of items are included in higher levels (e.g., higher levels include a greater number of items satisfying a broader category). Similarly, lower levels of the taxonomy include greater details about items, so fewer numbers of items are included in the lower levels (e.g., lower levels include a fewer number of items satisfying a more specific category). The taxonomy may be received from a warehouse 210 in various embodiments. In other embodiments, the inventory management engine 302 applies a trained classification model to an item catalog received from a warehouse 210 to include different items in levels of the taxonomy, so application of the trained classification model associates specific items with categories corresponding to levels within the taxonomy.

Inventory information provided by the inventory management engine 302 may supplement training datasets 320. Inventory information provided by the inventory management engine 302 may not necessarily include information about the outcome of fulfilling a delivery order associated with the item, whereas the data within the training datasets 320 is structured to include an outcome of fulfilling a delivery order (e.g., if an item in an order was or was not collected).

The online concierge system 102 also includes an order fulfillment engine 306 which is configured to synthesize and display an ordering interface to each customer 204 (for example, via the customer mobile application 206). The order fulfillment engine 306 is also configured to access the inventory database 304 in order to determine which items are available at which warehouse 210. The order fulfillment engine 306 may supplement the item availability information from the inventory database 304 with item availability information predicted by a machine learning item availability model 316. The order fulfillment engine 306 determines a sale price for each item ordered by a customer 204. Prices set by the order fulfillment engine 306 may or may not be identical to in-store prices determined by retailers (which is the price that customers 204 and shoppers 208 would pay at the retail warehouses 210). The order fulfillment engine 306 also facilitates transactions associated with each order. In one embodiment, the order fulfillment engine 306 charges a payment instrument associated with a customer 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device 110 of a customer 204 for display via the customer mobile application 206. The order fulfillment engine 306 receives a query comprising one or more terms from a customer 204 and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. Details of an order may indicate the items purchased, a total value of the items, and in some cases, an identity of a shopper 208 and a customer 204 associated with the order. In one embodiment, the order fulfillment engine 306 pushes transaction and/or order details asynchronously to retailer systems. This may be accomplished via the use of webhooks, which enable programmatic or system-driven transmission of information between web applications. In another embodiment, retailer systems may be configured to periodically poll the order fulfillment engine 306, which provides details of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 210 to fulfill the order based on one or more parameters, such as a probability of item availability determined by the machine learning item availability model 316, the contents of the order, the inventory of the warehouses 210, and the proximity of the warehouses 210 to the delivery location. The shopper management engine 310 then identifies one or more appropriate shoppers 208 to fulfill the order based on one or more parameters, such as the shoppers' proximity to the appropriate warehouse 210 (and/or to the customer 204), his/her familiarity level with that particular warehouse 210, etc. Additionally, the shopper management engine 310 accesses a shopper database 312 which stores information describing each shopper 208, such as his/her name, gender, rating, previous shopping history, etc.

As part of fulfilling an order, the order fulfillment engine 306 and/or shopper management engine 310 may access a customer database 314, which stores profile information associated with each customer 204. In some embodiments, the customer database 314 may store profile information associated with each customer 204 who is a user of the online concierge system 102 (e.g., a customer 204 who has placed an order to be fulfilled by a shopper 208). In various embodiments, the customer database 314 also or alternatively may store profile information associated with each customer 204 of one or more retailers associated with one or more warehouses 210, in which a customer 204 may or may not be associated with the online concierge system 102 (e.g., a customer 204 of a retailer associated with a warehouse 210 who is doing their own shopping at the warehouse 210). Profile information stored in the customer database 314 may include each customer's name, address, gender, preferences, favorite items, stored payment instruments, order history, etc. In some embodiments, profile information associated with a customer 204 stored in the customer database 314 may describe one or more preferences of the customer 204 for items having various attributes. Preferences for items may describe types, qualities, quantities, colors, sizes, brands, manufacturing locations, ingredients, packaging, or any other attributes of items. For example, the customer database 314 may store information describing a preference of a customer 204 for certain types of milk (e.g., oat and soy). As an additional example, the customer database 314 may store information describing a preference of a customer 204 for a particular brand of coffee creamer and a minimum number of days between an expiration date and a current date for dairy items.

In some embodiments, preferences stored in the customer database 314 also may include a customer's dislike for items having various attributes and/or a set of restrictions associated with the customer 204. For example, if a customer 204 is allergic to peanuts, preferences included among the customer's profile information may indicate that the customer 204 has a dietary restriction related to peanuts and is therefore unlikely to be interested in food items including peanuts as an ingredient. As an additional example, if a customer 204 previously reported a problem with a delivery order, in which organic blueberries requested by the customer 204 were unavailable and were replaced with non-organic blueberries and the customer 204 indicated that the replacement item was a poor replacement, preferences included among the customer's profile information may indicate that the customer 204 dislikes non-organic blueberries.

Profile information associated with a customer 204 stored in the customer database 314 may include the customer's order and/or purchase history and/or one or more lists of items (e.g., shopping lists) associated with the customer 204. Information describing an order/purchase included in a customer's order/purchase history may include a date and time of the order/purchase, information describing items included in the order/purchase, a price of each item included in the order/purchase, a total cost of the order/purchase, a warehouse 210 at which the order/purchase was fulfilled/completed, coupons, discounts, or other promotions applied to the order/purchase, or any other information that may be associated with an order/purchase. In embodiments in which the customer database 314 includes one or more lists of items associated with a customer 204, each list may include one or more items specified by the customer 204. Each list of items associated with a customer 204 may be created by the customer 204 using an interface generated and transmitted by the interface engine 324, as described below. Similar to each order/purchase included in an order/purchase history, information describing a list of items may include a date the list was created, information describing items included in the list, information identifying a warehouse 210 at which items on the list were collected, or any other suitable types of information that may be associated with a list of items.

In various embodiments, profile information stored in the customer database 314 also may include one or more goals associated with a customer 204. A goal associated with a customer 204 may describe the customer's personal goals (e.g., health goals, nutritional goals, etc.). For example, profile information stored in the customer database 314 may describe goals of a customer 204 to lose weight, increase protein intake, and eat fewer processed foods. As an additional example, profile information associated with a customer 204 may describe a goal of saving money on groceries.

In some embodiments, profile information stored in the customer database 314 also may include information received from the interface engine 324 (described below) describing augmented reality elements sent to display areas of client devices 110 associated with customers 204. In such embodiments, the customers 204 may be users of the client devices 110 or may have placed orders fulfilled by shoppers 208 who were using the client devices 110 when the augmented reality elements were sent. Information describing an augmented reality element sent to a display area of a client device 110 associated with a customer 204 may describe a function of the augmented reality element (e.g., to call attention to an item, to promote an item, to compare items, etc.) and identify one or more items or other physical elements to which the augmented reality element was directed. The information also may identify one or more content items included in the augmented reality element (e.g., a coupon, a recipe, a video, etc.) and a date and time that the augmented reality element was sent to the display area of the client device 110.

In various embodiments, the order fulfillment engine 306 determines whether to delay display of a received order to shoppers 208 for fulfillment by a time interval. In response to determining to delay display of the received order by a time interval, the order fulfillment engine 306 evaluates subsequent orders received during the time interval for inclusion in one or more batches that also include the received order. After the time interval, the order fulfillment engine 306 displays the order to one or more shoppers 208 via the shopper mobile application 212; if the order fulfillment engine 306 generated one or more batches including the received order and one or more subsequent orders received during the time interval, the batches are also displayed to one or more shoppers 208 via the shopper mobile application 212.

Machine Learning Models

The online concierge system 102 further includes the machine learning item availability model 316, a modeling engine 318, and the training datasets 320. The modeling engine 318 uses the training datasets 320 to generate the machine learning item availability model 316. The machine learning item availability model 316 may learn from the training datasets 320, rather than follow only explicitly programmed instructions. The inventory management engine 302, order fulfillment engine 306, and/or shopper management engine 310 may use the machine learning item availability model 316 to determine a probability that an item is available at a warehouse 210. The machine learning item availability model 316 may be used to predict item availability for items being displayed to or selected by a customer 204 or included in received delivery orders. A single machine learning item availability model 316 is used to predict the availability of any number of items.

The machine learning item availability model 316 may be configured to receive, as inputs, information about an item, a warehouse 210 for collecting the item, and a time for collecting the item. The machine learning item availability model 316 may be adapted to receive any information that the modeling engine 318 identifies as an indicator of item availability. At a minimum, the machine learning item availability model 316 receives information about an item-warehouse pair, such as an item in a delivery order and a warehouse 210 at which the order may be fulfilled. Items stored in the inventory database 304 may be identified by item identifiers. As described above, various characteristics, some of which are specific to a warehouse 210 (e.g., a time that an item was last found in the warehouse 210, a time that the item was last not found in the warehouse 210, a rate at which the item is found, a popularity of the item, etc.) may be stored for each item in the inventory database 304. Similarly, each warehouse 210 may be identified by a warehouse identifier and stored in a warehouse database along with information about the warehouse 210. A particular item at a particular warehouse 210 may be identified using an item identifier and a warehouse identifier. In other embodiments, the item identifier refers to a particular item at a particular warehouse 210, so that the same item at two different warehouses 210 is associated with two different identifiers. For convenience, both of these options to identify an item at a warehouse 210 are referred to herein as an "item-warehouse pair." Based on the identifiers, the online concierge system 102 may extract information about the item and/or warehouse 210 from the inventory database 304 and/or warehouse database and provide this extracted information as inputs to the machine learning item availability model 316.

The machine learning item availability model 316 contains a set of functions generated by the modeling engine 318 from the training datasets 320 that relate an item, a warehouse 210, timing information, and/or any other relevant inputs, to a probability that the item is available at the warehouse 210. Thus, for a given item-warehouse pair, the machine learning item availability model 316 outputs a probability that the item is available at the warehouse 210. The machine learning item availability model 316 constructs a relationship between the item-warehouse pair, the timing information, and/or any other inputs and the probability of availability (also referred to as "availability") that is generic enough to apply to any number of different item-warehouse pairs. In some embodiments, the probability output by the machine learning item availability model 316 includes a confidence score. The confidence score may be the error or uncertainty score of the probability of availability and may be calculated using any standard statistical error measurement. In some embodiments, the confidence score is based in part on whether the item-warehouse pair availability prediction was accurate for previous delivery orders (e.g., if an item was predicted to be available at a warehouse 210 and was not found by a shopper 208 or was predicted to be unavailable but was found by the shopper 208). In various embodiments, the confidence score is based in part on the age of the data for the item (e.g., if availability information has been received within the past hour or the past day). The set of functions of the machine learning item availability model 316 may be updated and adapted following retraining with new training datasets 320. The machine learning item availability model 316 may be any machine learning model, such as a neural network, a boosted tree, a gradient-boosted tree, or a random forest model. In some embodiments, the machine learning item availability model 316 is generated from the XGBoost algorithm. The probability of availability of an item generated by the machine learning item availability model 316 may be used to determine instructions delivered to a customer 204 and/or shopper 208, as described in further detail below.

The training datasets 320 relate a variety of different factors to known item availabilities from the outcomes of previous delivery orders (e.g., if an item was previously found or previously unavailable). The training datasets 320 include items included in previous delivery orders, whether the items in the previous delivery orders were collected, warehouses 210 associated with the previous delivery orders, and a variety of characteristics associated with each of the items, which may be obtained from the inventory database 304. Each piece of data in the training datasets 320 includes an outcome of a previous delivery order (e.g., whether an item was collected). Item characteristics may be determined by the machine learning item availability model 316 to be statistically significant factors predictive of an item's availability. Item characteristics that are predictors of availability may be different for different items. For example, an item type factor might be the best predictor of availability for dairy items, whereas a time of day may be the best predictive factor of availability for vegetables. For each item, the machine learning item availability model 316 may weight these factors differently, in which the weights are a result of a "learning" or a training process on the training datasets 320. The training datasets 320 are very large datasets taken across a wide cross section of warehouses 210, shoppers 208, items, delivery orders, times, and item characteristics. The training datasets 320 are large enough to provide a mapping from an item in an order to a probability that the item is available at a warehouse 210. In addition to previous delivery orders, the training datasets 320 may be supplemented by inventory information provided by the inventory management engine 302. In some embodiments, the training datasets 320 are historical delivery order information used to train the machine learning item availability model 316, whereas the inventory information stored in the inventory database 304 includes factors input into the machine learning item availability model 316 to determine an item availability for an item in a newly received delivery order. In various embodiments, the modeling engine 318 may evaluate the training datasets 320 to compare a single item's availability across multiple warehouses 210 to determine if an item is chronically unavailable, which may indicate that the item is no longer manufactured. The modeling engine 318 may query a warehouse 210 through the inventory management engine 302 for updated item information about any such items.

Machine Learning Factors

The training datasets 320 include times associated with previous delivery orders. In some embodiments, the training datasets 320 include a time of day at which each previous delivery order was placed. Item availability may be impacted by time of day since items that are otherwise regularly stocked by warehouses 210 may become unavailable during high-volume shopping times. In addition, item availability may be affected by restocking schedules. For example, if a warehouse 210 mainly restocks items at night, item availability at the warehouse 210 will tend to decrease over the course of the day. Additionally, or alternatively, the training datasets 320 include a day of the week that previous delivery orders were placed. The day of the week may impact item availability since warehouses 210 may have reduced item inventory on popular shopping days and restocking shipments may be received on particular days. In some embodiments, the training datasets 320 include a time interval since an item was previously collected for a previous delivery order. If an item has recently been collected at a warehouse 210, this may increase the probability that it is still available. If a long interval of time has elapsed since an item has been collected, this may indicate that the probability that the item is available for subsequent orders is low or uncertain. In some embodiments, the training datasets 320 include a time interval since an item in a previous delivery order was not found. If a short interval of time has elapsed since an item was not found, this may indicate that there is a low probability that the item will be available for subsequent delivery orders. Conversely, if a long interval of time has elapsed since an item was not found, this may indicate that the item may have been restocked and will be available for subsequent delivery orders. In some embodiments, the training datasets 320 may also include a rate at which an item is typically found by a shopper 208 at a warehouse 210, a number of days since inventory information about the item was last received from the inventory management engine 302, a number of times the item was not found during a previous week, or any number of additional rate-related or time-related information. Relationships between this rate-related and/or time-related information and item availability are determined by the modeling engine 318, which trains a machine learning model with the training datasets 320, producing the machine learning item availability model 316.

The training datasets 320 include item characteristics. In some embodiments, the item characteristics include a department associated with an item. For example, if an item is yogurt, it is associated with a dairy department. Examples of departments include bakery, beverage, nonfood, pharmacy, produce, floral, deli, prepared foods, meat, seafood, dairy, or any other categorization of items used by a warehouse 210. A department associated with an item may affect item availability since different departments have different item turnover rates and inventory levels. In some embodiments, the item characteristics include an aisle of a warehouse 210 associated with an item. The aisle of the warehouse 210 may affect item availability since different aisles of a warehouse 210 may be restocked more frequently than others. Additionally, or alternatively, the item characteristics may include an item popularity score. The item popularity score for an item may be proportional to the number of delivery orders received that include the item. An alternative or additional item popularity score may be provided by a retailer through the inventory management engine 302. In some embodiments, the item characteristics include a product type associated with an item. For example, if an item is a particular brand of a product, the product type will be a generic description of the product type, such as "milk" or "eggs." The product type may affect item availability since certain product types may have higher turnover and restocking rates than others or may have larger inventories in the warehouses 210. In some embodiments, the item characteristics may include a number of times a shopper 208 was instructed to keep looking for an item after he or she was initially unable to find the item, a total number of delivery orders received for an item, whether or not an item is organic, vegan, gluten free, or any other characteristics associated with an item. The relationships between item characteristics and item availability are determined by the modeling engine 318, which trains a machine learning model with the training datasets 320, producing the machine learning item availability model 316.

The training datasets 320 may include additional item characteristics that affect item availability and may therefore be used to build the machine learning item availability model 316 relating a delivery order including an item to the item's predicted availability. The training datasets 320 may be periodically updated with recent delivery orders. The training datasets 320 may be updated with item availability information provided directly from shoppers 208. Following updating of the training datasets 320, the modeling engine 318 may retrain a model with the updated training datasets 320 and produce a new machine learning item availability model 316.

Item Detection Components

In some embodiments, the online concierge system 102 further includes a layout database 322. The layout database 322 stores one or more layouts of one or more warehouses 210. In some embodiments, a layout of a warehouse 210 may be received from a retailer associated with the warehouse 210 and updated by the retailer. A layout of a warehouse 210 may be stored in the layout database 322 in association with information that uniquely identifies the warehouse 210, such as a name of the warehouse 210, a geographic location of the warehouse 210, etc. For example, a layout of a warehouse 210 may be stored in association with GPS coordinates associated with the warehouse 210, a combination of a name of a retailer associated with the warehouse 210 and a city and state in which the warehouse 210 is located, etc.

A layout of a warehouse 210 may describe departments and/or physical elements within the warehouse 210, such as organizational elements, including aisles, shelves within the aisles, various display areas (e.g., frozen or refrigerated display cases, display tables, and sample and promotional displays), etc., as well as their arrangement within the warehouse 210. In addition to organizational elements, a layout of a warehouse 210 also may describe additional physical elements within the warehouse 210, such as items included among an inventory of the warehouse 210, service counters (e.g., for various departments and/or checkout counters), and various building elements (e.g. entrances/exits, floors, ceilings, walls, stairs, elevators, etc.), and their arrangement within the warehouse 210. A layout of a warehouse 210 also may include one or more images of departments and physical elements within the warehouse 210 captured from one or more angles, positions, etc.

Additionally, a layout of a warehouse 210 may describe a set of locations within the warehouse 210 associated with each item included among its inventory. A location within a warehouse 210 associated with an item may correspond to a particular area within the warehouse 210 at which the item may be collected. For example, a layout of a warehouse 210 may describe one or more locations within the warehouse 210 associated with an item, in which each location corresponds to a particular aisle, a particular shelf, a particular display table, a particular promotional display, etc., at which the item may be collected.

In some embodiments, the online concierge system 102 further includes an interface engine 324. The interface engine 324 generates augmented reality elements that are overlaid onto portions of display areas of client devices 110 to which the augmented reality elements are sent. Augmented reality elements may be configured to perform various functions with respect to items included among an inventory of a warehouse 210 detected within a display area of a client device 110, including calling attention to them and/or their attributes, obscuring them, comparing them, recommending different items, and promoting them. In some embodiments, augmented reality elements also or alternatively may be configured to perform the same functions with respect to other physical elements (e.g., advertisements, coupons, etc.) detected within a display area of a client device 110. Augmented reality elements also may be configured to present lists of items (e.g., items included in an order or a shopping list).

In embodiments in which the interface engine 324 generates an augmented reality element that calls attention to an item included among an inventory of a warehouse 210 detected within a display area of a client device 110, the augmented reality element may call attention to the item by highlighting it (e.g., with one or more colors) or with icons (e.g., arrows or circles), animations, etc. For example, an augmented reality element may call attention to an item detected within a display area of a client device 110 by encircling a portion of the display area at which the item is detected with a colored halo. An augmented reality element may call attention to an item for various reasons (e.g., if the item is included in an order or a shopping list, if one or more attributes of the item match profile information associated with a customer 204, etc.). For example, if a set of preferences associated with a customer 204 includes a dietary restriction indicating that the customer 204 is allergic to pineapple, an augmented reality element may call attention to an item that contains pineapple with a warning icon that hovers over or near a portion of a display area of a client device 110 at which the item is detected. In this example, if the set of preferences associated with the customer 204 also indicates that the customer 204 likes strawberries, another augmented reality element may call attention to strawberry-flavored candy with a heart icon that hovers over or near a portion of the display area of the client device 110 at which the item is detected. As yet another example, an augmented reality element may call attention to an item that is included in an order or a shopping list by encircling a portion of a display area of a client device 110 at which the item is detected with a colored halo. In some embodiments, a user of a client device 110 may adjust one or more settings to change an appearance of an augmented reality element that calls attention to an item (e.g., by changing one or more colors of highlights, by changing the style of icons or animations, etc.).

In embodiments in which the interface engine 324 generates an augmented reality element that calls attention to an attribute of an item (e.g., size, variety, brand, etc.) included among an inventory of a warehouse 210 detected within a display area of a client device 110, the augmented reality element may call attention to the attribute by highlighting it or with icons, animations, etc. An augmented reality element may call attention to an attribute of an item for various reasons (e.g., if an item having the attribute is included in an order or a shopping list, if the attribute matches profile information associated with a customer 204, etc.). For example, suppose that profile information stored in the customer database 314 indicates that a customer 204 is allergic to soy and the item/location detection engine 326 (described below) detects that the customer 204 is holding an item that contains soy. In this example, the experience enhancement engine 332 (also described below) may infer that the customer 204 is thinking about purchasing the item and may match the soy ingredient with the profile information indicating the customer 204 is allergic to soy. Continuing with this example, based on the inference, the interface engine 324 may generate an augmented reality element that calls attention to the word "soy" in a list of ingredients on the item detected within a display area of a client device 110 with a warning icon and by encircling a portion of the display area in which the word is detected with a red halo. As an additional example, if an item (e.g., ground coffee) is included in a shopping list, an augmented reality element may call attention to information describing an attribute of the item (e.g., the word "ground" on the item) detected within a display area of a client device 110 by encircling a portion of the display area in which the information is detected with a green halo. In various embodiments, multiple augmented reality elements may call attention to different attributes by highlighting them differently (e.g., with different colors) or with different icons, different animations, etc. In the above example, if another item (e.g., whole bean coffee) is not included in the shopping list, another augmented reality element may call attention to information describing an attribute of the item (e.g., the word "whole bean" on the item) detected within the display area of the client device 110 by encircling a portion of the display area in which the information is detected with a red halo. In some embodiments, a user of a client device 110 may adjust one or more settings to change an appearance of an augmented reality element that calls attention to an attribute of an item (e.g., by changing one or more colors of highlights, by changing the style of icons or animations, etc.).

In embodiments in which the interface engine 324 generates an augmented reality element that obscures an item included among an inventory of a warehouse 210 detected within a display area of a client device 110, the augmented reality element may obscure the item by blocking it partially or completely from view, blurring it, etc. For example, an augmented reality element, such as a colored rectangle or other shape that is mostly or completely opaque, may obscure an item if it is overlaid onto a portion of a display area of a client device 110 at which the item is detected. An augmented reality element may obscure an item for various reasons (e.g., if profile information associated with a customer 204 indicates that the customer 204 dislikes the item/attributes of the item, if the profile information indicates the customer 204 has a restriction, such as a dietary restriction, associated with the item, etc.). For example, suppose that the item/location detection engine 326 (described below) detects an advertisement for an item within a display area of a client device 110 and the experience enhancement engine 332 (also described below) matches an attribute of the item with information stored in the customer database 314 indicating that a customer 204 dislikes items with the attribute. In this example, the interface engine 324 may generate an augmented reality element that includes a coupon for a different item that does not have the attribute, in which the augmented reality element may obscure the advertisement if it is overlaid onto a portion of the display area at which the advertisement is detected. As an additional example, suppose that the item/location detection engine 326 detects items within a display area of a client device 110 and the experience enhancement engine 332 matches a dairy attribute of the items with information stored in the customer database 314 indicating that a customer 204 is allergic to dairy. In this example, the interface engine 324 may generate augmented reality elements that are colored rectangles, in which the augmented reality elements are mostly opaque and may obscure the detected items if they are overlaid onto portions of the display area at which the items are detected. In some embodiments, a user of a client device 110 may adjust one or more settings to change an augmented reality element that obscures an item (e.g., by changing the method by which it obscures the item, by changing its opacity, etc.).

In embodiments in which the interface engine 324 generates an augmented reality element that compares items included among an inventory of a warehouse 210 detected within a display area of a client device 110, the augmented reality element may include statistics associated with each item or other values of one or more attributes of each item. An augmented reality element may compare two or more items for various reasons (e.g., if a user of a client device 110 is holding the items, if the items are detected within a display area of a client device 110 for at least a threshold amount of time, etc.). For example, an augmented reality element that compares two sports drinks being held by a user of a client device 110 may include side-by-side statistics associated with the drinks (e.g., sugar content, number of calories, and price per ounce). Furthermore, an augmented reality element that compares items may highlight certain statistics, such as statistics related to profile information associated with a customer 204 that the experience enhancement engine 332 (described below) matches with one or more attributes of the items. In the above example, if the customer 204 is on a diet that limits their sugar intake, the augmented reality element may highlight the sugar content of the drinks. In some embodiments, a user of a client device 110 may adjust one or more settings to change an augmented reality element that compares items, such as how statistics or other values are displayed (e.g., numerically in a table or graphically in a chart), by changing the types of values displayed, etc.

In embodiments in which the interface engine 324 generates an augmented reality element that recommends an item included among an inventory of a warehouse 210, the augmented reality element may include information associated with the item (e.g., brand, type, size, nutritional information, price, discounts or coupons that may apply to the item, etc.) and a reason the item is being recommended. An item may be recommended if a customer 204 is likely to purchase it (e.g., based on their order/purchase history or other profile information, other items included in an order or shopping list, etc.), if a customer 204 is likely to prefer it to another item (e.g., another item the customer 204 is considering purchasing), etc. For example, suppose that the experience enhancement engine 332 identifies a replacement item that is similar to another item a customer 204 is holding and the customer 204 is likely to prefer the replacement item to the item they are holding because the replacement item is on sale. In this example, an augmented reality element that recommends the replacement item may indicate this and include a description of the replacement item. In some embodiments, a user of a client device 110 may adjust one or more settings to change augmented reality elements that recommend items, such as types of information about the items being recommended (e.g., unit price, item price, brand, etc.), criteria for recommending items, etc.

In embodiments in which the interface engine 324 generates an augmented reality element that promotes an item included among an inventory of a warehouse 210 detected within a display area of a client device 110, the augmented reality element may be generated based on content associated with the item (e.g., stored in the content database 328). An augmented reality element may promote an item for various reasons (e.g., it is a new item, a customer 204 is considering purchasing it, it is on sale or associated with a promotion, etc.). In some embodiments, the interface engine 324 generates augmented reality elements that promote items based on promotional content (e.g., advertisements, coupons, deals, etc.) associated with the items. For example, the interface engine 324 may generate an augmented reality element promoting an item that includes an advertisement or a coupon associated with the item (e.g., buy one, get one free). In various embodiments, the interface engine 324 generates augmented reality elements that promote items based on content describing how the items may be used. For example, if an item is a food item, the interface engine 324 may generate an augmented reality element promoting the item with a recipe that includes the item as an ingredient. As an additional example, if an item is an article of clothing or an accessory, the interface engine 324 may generate an augmented reality element promoting the item that includes an image or a video clip of a person modeling the item.

In some embodiments, the interface engine 324 generates an augmented reality element that includes a list of items included among an inventory of a warehouse 210. A list may include one or more items identified by a customer 204 (e.g., in an order received from the customer 204) or by a user of a client device 110 (e.g., in a shopping list received in an input via an interface generated and transmitted by the interface engine 324, as described below). For example, if a customer 204 places a delivery order via the online concierge system 102, the interface engine 324 may generate an augmented reality element that includes a list of items included in the order. In this example, the augmented reality element subsequently may be sent to a display area of a client device 110 associated with a shopper 208 assigned to fulfill the order. As an additional example, if information identifying items included in a shopping list is received in an input from a user of a client device 110 via the interface generated and transmitted by the interface engine 324, the interface engine 324 may generate an augmented reality element that includes the shopping list. In some embodiments, a list of items also may include information describing one or more locations within a warehouse 210 associated with each item included in the list (e.g., one or more locations at which each item may be collected). In such embodiments, the interface engine 324 may access a layout of the warehouse 210 from the layout database 322 and generate an augmented reality element including the list based on information included in the layout describing a set of locations within a warehouse 210 associated with each item. For example, the interface engine 324 may generate an augmented reality element including a shopping list, in which each item is listed in association with a location within a warehouse 210 (e.g., an aisle number, an endcap identifier, etc.) at which the corresponding item may be collected.

In some embodiments, if the interface engine 324 generates an augmented reality element that includes a list of one or more items included among an inventory of a warehouse 210, the augmented reality element may be updated. In such embodiments, the interface engine 324 may update the augmented reality element if an item is collected, if an item is added to or removed from the list, etc. For example, if the interface engine 324 generates an augmented reality element that includes a shopping list, as each item included in the shopping list is collected, the interface engine 324 may update the augmented reality element (e.g., by checking a checkbox next to each collected item, by crossing each collected item off the list, by removing each collected item from the list, etc.).

Once the interface engine 324 generates or updates augmented reality elements, the interface engine 324 may send them to display areas of client devices 110. As described above, augmented reality elements are overlaid onto portions of display areas of client devices 110 to which the augmented reality elements are sent. An augmented reality element may be overlaid onto a portion of a display area of a client device 110 based on a location within the display area at which an item is detected (e.g., by the item/location detection engine 326, described below). For example, an augmented reality element may be overlaid onto a portion of a display area of a client device 110 at which an item is detected. Alternatively, in the above example, the augmented reality element may be overlaid onto another portion of the display area, such that it appears to float in a corner of the display area or near the item detected within the display area. In various embodiments, as physical elements detected within a display area of a client device 110 move within the display area, one or more augmented reality elements may move as well. For example, if an augmented reality element calls attention to an item, as the item moves within a display area of a client device 110, the augmented reality element may move as well, such that it tracks the movement of the item. In some embodiments, augmented reality elements may be hidden by a user of a client device 110, such that they are not visible within a display area of the client device 110. For example, a user of a client device 110 may switch between different modes, such that in one mode, augmented reality elements are not visible within a display area of the client device 110, while in another mode, some or all of the augmented reality elements are visible within the display area of the client device 110.

In some embodiments, the interface engine 324 may store information describing augmented reality elements sent to client devices 110 in the customer database 314, such that this information is included among profile information associated with customers 204 associated with the client devices 110. In such embodiments, the customers 204 may be users of the client devices 110 or may have placed orders fulfilled by shoppers 208 who were using the client devices 110 when the augmented reality elements were sent. For example, suppose that the interface engine 324 sends an augmented reality element to a display area of a client device 110 associated with a customer 204, in which the augmented reality element promotes an item and includes a content item (e.g., a coupon) associated with the item. In this example, information describing the augmented reality element (information indicating that it promoted the item, information identifying the item and the content item, etc.) and a date and time that it was sent to the display area of the client device 110 may be stored among profile information associated with the customer 204 in the customer database 314.

The interface engine 324 also may generate and transmit an interface that includes one or more fields, buttons, or other interactive elements for receiving various inputs from a user of a client device 110. In some embodiments, the interface engine 324 may receive information identifying a warehouse 210 from a user of a client device 110 via the interface. For example, if a user of a client device 110 is at a warehouse 210, the user may select an option to share the location of the client device 110 by clicking on a button included in the interface. Alternatively, in the above example, the user may select the warehouse 210 from a drop-down menu included in the interface or type a name of a retailer associated with the warehouse 210 into a search box included in the interface and select the warehouse 210 from a list of results. In some embodiments, via the interface, the interface engine 324 also or alternatively may receive information from a user of a client device 110 identifying one or more items included among an inventory of a warehouse 210 to be collected from the warehouse 210 during a shopping trip. In such embodiments, upon receiving the input from the user via the interface, the interface engine 324 may retrieve information identifying items included among the inventory of the warehouse 210 based on the input (e.g., items having attributes with values that match at least a portion of the input identified by leveraging item embeddings). Via the interface, one or more items may then be added to a list of items (e.g., a shopping list) or subsequently removed from the list. For example, the interface may include a search box that allows a user to type in a name of an item, a description of an item, etc. In this example, the user may add one or more items included in a list of results to a shopping list and search for additional items to add to the shopping list.

In some embodiments, the interface generated and transmitted by the interface engine 324 also may receive inputs associated with one or more augmented reality elements generated by the interface engine 324. In such embodiments, the interface engine 324 may receive various requests from a user of a client device 110 via the interface (e.g., to adjust one or more settings associated with an augmented reality element, to check off items in a shopping list included in an augmented reality element, to claim an offer presented in an augmented reality element, etc.). For example, the interface engine 324 may receive a request from a user of a client device 110 to switch between different modes via the interface, in which different modes change the visibility of augmented reality elements to the user. As an additional example, if a shopping list is included in an augmented reality element, as items included in the shopping list are collected, the interface engine 324 may receive requests from a user of a client device 110 to check the collected items off the list via the interface.

The interface engine 324 also may receive image or video data captured by a camera of a client device 110, in which the image or video data includes a display area of the client device 110. For example, if a client device 110 is a smartphone, a camera of the smartphone may capture image or video data that is visible within a display area of the smartphone to a user of the smartphone. As an additional example, if a client device 110 is a pair of augmented reality glasses, a camera of the augmented reality glasses may capture image or video data that is visible to a user wearing the augmented reality glasses. The interface engine 324 may communicate image or video data it receives to the item/location detection engine 326, which may then detect various physical elements (e.g., items), positions of physical elements, etc. within a display area of a client device 110, as described below.

In some embodiments, the online concierge system 102 further includes an item/location detection engine 326. The item/location detection engine 326 may detect various physical elements (e.g., items included among an inventory of a warehouse 210, building elements, organizational elements, shopping carts or baskets, advertisements, etc.) within a display area of a client device 110. In some embodiments, the item/location detection engine 326 may do so based on images of the physical elements and image or video data captured by a camera of a client device 110. In such embodiments, images of the physical elements may include images of items included in a catalog stored in the inventory database 304, images of organizational elements and building elements included in a layout stored in the layout database 322, images of advertisements or other types of promotional content stored in the content database 328, etc. For example, suppose that video data captured by a camera of a client device 110 received by the interface engine 324 depicts a physical element, such as a box of cereal, displayed within a display area of the client device 110. In this example, the interface engine 324 may communicate the video data to the item/location detection engine 326, which may access images of items included in a catalog stored in the inventory database 304 and compare the depiction to the images of the items included in the catalog. In the above example, the item/location detection engine 326 may detect the box of cereal if the depiction has at least a threshold measure of similarity to one or more images of the box of cereal included in the catalog.

In some embodiments, the item/location detection engine 326 may detect physical elements using a machine learning model. For example, the item/location detection engine 326 may provide image or video data as an input to a machine learning model that is trained using images of various physical elements within one or more warehouses 210 (e.g., stored in the inventory database 304, the layout database 322, the content database 328, etc.). The item/location detection engine 326 may then receive an output from the model describing predicted likelihoods that each physical element is detected in the image or video data and determine that a physical element is detected if the corresponding predicted likelihood is at least a threshold likelihood.

In various embodiments, the item/location detection engine 326 may detect positions of physical elements relative to each other. In some embodiments, the item/location detection engine 326 may detect that a physical element is within another physical element, that a physical element is resting or stacked onto another physical element, etc. For example, if the item/location detection engine 326 detects an item included among an inventory of a warehouse 210 and a shopping basket, the item/location detection engine 326 also may detect that the item is within the shopping basket. In various embodiments, the item/location detection engine 326 may detect that items are being held by users of client devices 110 (e.g., based on the positions of the items relative to the users' hands). The item/location detection engine 326 may do so using various techniques, such as machine learning/object detection, depth perception, infrared/thermal imaging, or any other suitable technique or combination of techniques. For example, suppose that a client device 110 includes multiple infrared cameras, such that the client device 110 is capable of receiving depth perception information and heat-related information about an item detected within a display area of the client device 110 and other physical elements detected within the display area. In this example, the item/location detection engine 326 may detect that the item is being held if the item and a hand holding the item are moving together in directions and/or at speeds that are different from all or most other physical elements detected within the display area. In the above example, the item/location detection engine 326 also may detect that the item is being held if depth perception information indicates that the item and hand are closer to the client device 110 than the other physical elements and if heat-related information indicates that the item and hand emit different amounts of heat.

Personalization Components

In some embodiments, the online concierge system 102 further includes a content database 328. The content database 328 may store various types of content associated with items included among an inventory of a warehouse 210. Examples of types of content that may be associated with an item include promotional content, content describing how the item may be used, or any other types of content that may be associated with an item. For example, promotional content associated with an item may include advertisements for the item, coupons or deals associated with the item, offers associated with the item (e.g., free samples), etc. As an additional example, content describing how an item may be used may include a recipe that includes the item as an ingredient, an image or a video demonstrating how the item may be used, etc. Content stored in the content database 328 may be obtained from users, third-party systems 130 (e.g., websites or applications), or any other suitable source, and stored in the content database 328. Additionally, each content item stored in the content database 328 may have one or more attributes describing the content. Examples of attributes of a content item include a type associated with the content item (e.g., coupon, advertisement, recipe, etc.), information identifying one or more items associated with the content item, attributes of each item associated with the content item, one or more dates associated with the content item (e.g., an expiration date associated with a coupon or offer), a type of data included in the content item (e.g., image data, video data, text data, etc.), or any other suitable types of information. Attributes of a content item may be provided by a source from which the content item was received or may be determined by the online concierge system 102 from information included in the content item.

Additionally, in some embodiments, the content database 328 maintains a content graph identifying connections between content items stored in the content database 328. A connection between content items indicates that the connected content items each have one or more common attributes. In some embodiments, a connection between content items indicates that a customer 204 included items associated with each connected content item in a common order or included items associated with each connected content item in orders the online concierge system 102 received from the customer 204 within a threshold amount of time of each other. In various embodiments, each connection between content items includes a value, with the value providing an indication of a strength of a connection between the content items.

In some embodiments, the online concierge system 102 further includes a profile update engine 330. The profile update engine 330 may update profile information associated with a customer 204 stored in the customer database 314. In some embodiments, the profile update engine 330 may update a set of preferences associated with a customer 204 stored in the customer database 314 based on other profile information associated with the customer 204. For example, suppose that profile information associated with a customer 204 indicates that the customer 204 has a goal of losing weight by following a particular diet. In this example, the profile update engine 330 may update a set of preferences associated with the customer 204 indicating that the customer 204 has a preference for food items that may be consumed when on the diet (e.g., foods low in sugar and saturated fat) and a dislike for food items that are to be avoided when on the diet (e.g., foods high in sugar and saturated fat).

In some embodiments, the online concierge system 102 further includes an experience enhancement engine 332. The experience enhancement engine 332 may communicate various types of information to the interface engine 324, which may then generate augmented reality elements based on this information. In some embodiments, this information may include inferences made by the experience enhancement engine 332, information describing replacement items identified by the experience enhancement engine 332, and/or information describing profile or other information associated with customers 204 that the experience enhancement engine 332 matches with attributes of items or other physical elements. In various embodiments, this information also may include information the experience enhancement engine 332 accesses from various databases (e.g., the inventory database 304, the customer database 314, the content database 328, etc.).

In some embodiments, the experience enhancement engine 332 infers an intent of a user of a client device 110 based on information detected by the item/location detection engine 326 and communicates the inference to the interface engine 324, which then generates an augmented reality element based on the inference. In various embodiments, the experience enhancement engine 332 also may communicate an inference to the interface engine 324 in association with information retrieved from one or more databases, which the interface engine 324 also may use to generate an augmented reality element. For example, if the item/location detection engine 326 detects that a user of a client device 110 is holding an item or if the item has been detected within a display area of the client device 110 for at least a threshold amount of time, the experience enhancement engine 332 may infer that the user is thinking about purchasing the item. In this example, the experience enhancement engine 332 may retrieve promotional content (e.g., a coupon and an advertisement) associated with the item from the content database 328 and communicate the inference and the promotional content to the interface engine 324, which may then generate an augmented reality element that promotes the item by including the promotional content. Alternatively, in the above example, the experience enhancement engine 332 may retrieve a set of content from the content database 328 describing how the item may be used (e.g., a recipe that includes the item as an ingredient) and communicate the content to the interface engine 324, which may then generate an augmented reality element that promotes the item by including the content. As an additional example, if the item/location detection engine 326 detects that a user of a client device 110 is holding two or more items or if the items have been detected within a display area of the client device 110 for at least a threshold amount of time, the experience enhancement engine 332 may infer that the user is comparing the items. In this example, the experience enhancement engine 332 may access attributes of the items stored in the inventory database 304 and communicate the inference and the attributes to the interface engine 324, which may then generate an augmented reality element that compares the items based on the inference and attributes.

In some embodiments, the experience enhancement engine 332 also may infer an intent of a customer 204 based on items included in an order or shopping list associated with the customer 204 and content stored in the content database 328 (e.g., recipes). In such embodiments, the experience enhancement engine 332 may then communicate the inference and any information related to the inference (e.g., retrieved from the inventory database 304, the content database 328, etc.) to the interface engine 324, which may generate an augmented reality element based on the inference and information. For example, suppose that two items (e.g., graham crackers and marshmallows) that are ingredients in a popular recipe stored in the content database 328 that calls for three ingredients are included in an order placed by a customer 204. In this example, if the last ingredient (e.g., chocolate) is not included in the order, the experience enhancement engine 332 may infer that the customer 204 is likely to purchase this item as well and may send information describing the inference and the item (e.g., retrieved from the inventory database 304) to the interface engine 324. In the above example, the interface engine 324 may then generate an augmented reality element recommending the item, which is subsequently sent to a display area of a client device 110 associated with a shopper 208 assigned to fulfill the customer's order. Continuing with this example, the shopper 208 may then communicate the recommendation to the customer 204.

In embodiments in which the experience enhancement engine 332 communicates information stored in various databases (e.g., the inventory database 304, the content database 328, etc.) to the interface engine 324, which then generates augmented reality elements based on the information, the experience enhancement engine 332 may identify the information to be communicated based on profile information stored in the customer database 314. In some embodiments, the experience enhancement engine 332 may identify the information to be communicated based on profile information associated with customers 204 describing augmented reality elements sent to display areas of client devices 110 associated with the customers 204 and purchase histories of the customers 204. For example, profile information associated with a customer 204 may indicate that the customer 204 was much more likely to purchase items within a threshold amount of time after augmented reality elements including coupons associated with the items were sent to a display area of a client device 110 associated with the customer 204 than after augmented reality elements including other types of content were sent to a display area of a client device 110 associated with the customer 204. In the above example, based on the profile information, the experience enhancement engine 332 may be more likely to retrieve coupons from the content database 328 than other types of content to communicate to the interface engine 324, which may then generate an augmented reality element to be sent to a display area of a client device 110 associated with the customer 204 based on the content.

In some embodiments, the experience enhancement engine 332 also may use a machine learning model to identify information to communicate to the interface engine 324. For example, the experience enhancement engine 332 may provide profile information associated with a customer 204 and information identifying an item as an input to a machine learning model. In this example, the model may be trained using profile information associated with customers 204 stored in the customer database 314 (e.g., information describing augmented reality elements previously sent to display areas of client devices 110 associated with the customers 204, preferences associated with the customers 204, order/purchase histories associated with the customers 204, etc.) and content stored in the content database 328. Continuing with this example, the experience enhancement engine 332 may then receive an output from the model describing predicted likelihoods that the customer 204 will purchase the item after an augmented reality element that may be generated based on each content item associated with the item is sent to a display area of a client device 110 associated with the customer 204. In the above example, the experience enhancement engine 332 may identify one or more content items to communicate to the interface engine 324 associated with the highest predicted likelihoods.

The experience enhancement engine 332 also may match profile information associated with a customer 204 (e.g., stored in the customer database 314) with one or more attributes of one or more items included among an inventory of a warehouse 210 (e.g., stored in the inventory database 304). The experience enhancement engine 332 may then communicate information describing the match to the interface engine 324, which may generate an augmented reality element based on the information. For example, if profile information stored in the customer database 314 indicates that a customer 204 is on a low-sugar diet, the experience enhancement engine 332 may match this information with attributes of items the customer 204 is holding corresponding to their sugar content and communicate information describing the match to the interface engine 324. In this example, based on the information describing the match, an augmented reality element generated by the interface engine 324 comparing the items may highlight their sugar content. As an additional example, suppose that attributes of a roll of paper towels stored in the inventory database 304 indicate a brand, an item type, and a size associated with the paper towels and profile information associated with a customer 204 stored in the customer database 314 includes an order history that indicates the customer 204 orders the roll of paper towels with the corresponding attributes about once every month. In the above example, if the customer 204 has not ordered the roll of paper towels with the corresponding attributes in about a month, the experience enhancement engine 332 may match the attributes with the order history and communicate information describing the match to the interface engine 324. Continuing with this example, based on the match, the interface engine 324 may then generate an augmented reality element that recommends the roll of paper towels (e.g., with a "Buy it again" heading) when overlaid onto a display area of a client device 110 associated with a shopper 208 fulfilling an order on behalf of the customer 204. In this example, the shopper 208 may then communicate the recommendation to the customer 204.

In various embodiments, the experience enhancement engine 332 also may match profile information associated with a customer 204 (e.g., stored in the customer database 314) with attributes of other types of physical elements within a warehouse 210, such as advertisements or coupons (e.g., stored in the content database 328 and/or the inventory database 304). In such embodiments, the experience enhancement engine 332 may communicate information describing the match to the interface engine 324, which may generate an augmented reality element based on the information. For example, suppose that an advertisement for a can of coconut milk is detected within a display area of a client device 110 associated with a customer 204 and attributes of the advertisement include nutritional information associated with the can of coconut milk stored in the inventory database 304 corresponding to 13 grams of saturated fat. In this example, if a dietary restriction associated with the customer 204 stored in the customer database 314 indicates that the customer 204 is on a diet that prohibits saturated fat, the experience enhancement engine 332 may match the attribute with the dietary restriction and communicate information describing the match to the interface engine 324. Continuing with this example, based on the information describing the match, the interface engine 324 may generate an augmented reality element that obscures the advertisement for the can of coconut milk when overlaid onto a portion of the display area of the client device 110 at which the advertisement is detected.

In some embodiments, the experience enhancement engine 332 may identify replacement items that customers 204 are likely to prefer to other items that may be replaced (e.g., items customers 204 are holding). To identify replacement items, the experience enhancement engine 332 may first identify potential replacement items having attributes that have at least a threshold measure of similarity to attributes of the items that may be replaced. The experience enhancement engine 332 may then identify replacement items from the potential replacement items based on profile information associated with customers 204 and attributes of the potential replacement items.

The experience enhancement engine 332 may identify potential replacement items in various ways. In some embodiments, the experience enhancement engine 332 may access a set of attributes of an item that may be replaced and attributes of other items included among an inventory of a warehouse 210 (e.g., stored in the inventory database 304). In such embodiments, the experience enhancement engine 332 may then identify a set of potential replacement items that each have a set of attributes that have at least a threshold measure of similarity to the set of attributes of the item that may be replaced. Examples of attributes of an item include a type of the item, ingredients of the item, a brand of the item, a manufacturer of the item, a cost of the item, a size of the item, one or more dimensions of the item, a quantity of the item, a quality of the item, a manufacturing location of the item, nutritional information associated with the item, one or more materials of the item, or any other suitable attributes of an item. In various embodiments, the experience enhancement engine 332 may access a taxonomy maintained by the inventory management engine 302 described above and identify a set of potential replacement items included in a most specific category in which an item that may be replaced is included.

In some embodiments, the experience enhancement engine 332 may predict likelihoods that customers 204 will prefer potential replacement items to items that may be replaced. To do so, the experience enhancement engine 332 may access profile information associated with a customer 204 (e.g., stored in the customer database 314), attributes of each potential replacement item, and attributes of an item that may be replaced (e.g., stored in the inventory database 304). The experience enhancement engine 332 may then predict a likelihood that the customer 204 will prefer each potential replacement item to the item that may be replaced based on the profile information, the attributes of the item that may be replaced, and the attributes of each potential replacement item. In some embodiments, the experience enhancement engine 332 may predict the likelihoods by matching profile information associated with the customer 204 with one or more attributes of each potential replacement item and one or more attributes of the item that may be replaced. For example, suppose that a customer 204 is holding an item that they have never purchased and that the only profile information associated with the customer 204, that matches an attribute of the item corresponds to an item type for one or more items included in their purchase history. In this example, suppose also that the purchase history indicates that the customer 204 previously purchased a potential replacement item several times when it was on sale, such that the profile information matches multiple attributes of the potential replacement item (e.g., its brand, type, etc. and information indicating it is on sale). In the above example, the experience enhancement engine 332 may then predict a likelihood (e.g., 85%) that the customer 204 will prefer the potential replacement item to the item they are holding based on the match.

The experience enhancement engine 332 may then identify replacement items from potential replacement items based on the predicted likelihoods that customers 204 will prefer the replacement items to items that may be replaced. In some embodiments, the experience enhancement engine 332 may identify one or more replacement items associated with at least a threshold likelihood from the set of potential replacement items. Alternatively, the experience enhancement engine 332 may rank the set of potential replacement items based on the predicted likelihood associated with each potential replacement item and identify one or more replacement items based on the ranking (e.g., one or more replacement items associated with at least a threshold ranking). The experience enhancement engine 332 may then communicate information to the interface engine 324 identifying the replacement items and information indicating why the customer 204 is likely to prefer the replacement items to the item that may be replaced. The interface engine 324 may then generate an augmented reality element that recommends the replacement items. In embodiments in which multiple replacement items are identified, an augmented reality element that recommends the replacement items may list the replacement items in an order based on the ranking described above.

In some embodiments, the experience enhancement engine 332 also may identify replacement items using a machine learning model. For example, the experience enhancement engine 332 may provide attributes of a customer 204 as an input to a machine learning model that is trained using profile information associated with customers 204 (e.g., order/purchase histories, preferences, etc.) stored in the customer database 314 and attributes of items included among an inventory of a warehouse 210 stored in the inventory database 304. The experience enhancement engine 332 may then receive an output from the model describing predicted likelihoods that the customer 204 will purchase each item included among the inventory of the warehouse 210. In this example, the experience enhancement engine 332 may identify a potential replacement item as a replacement item if the potential replacement item is associated with a likelihood that is greater than a likelihood associated with the item that may be replaced.

Figure 3B:
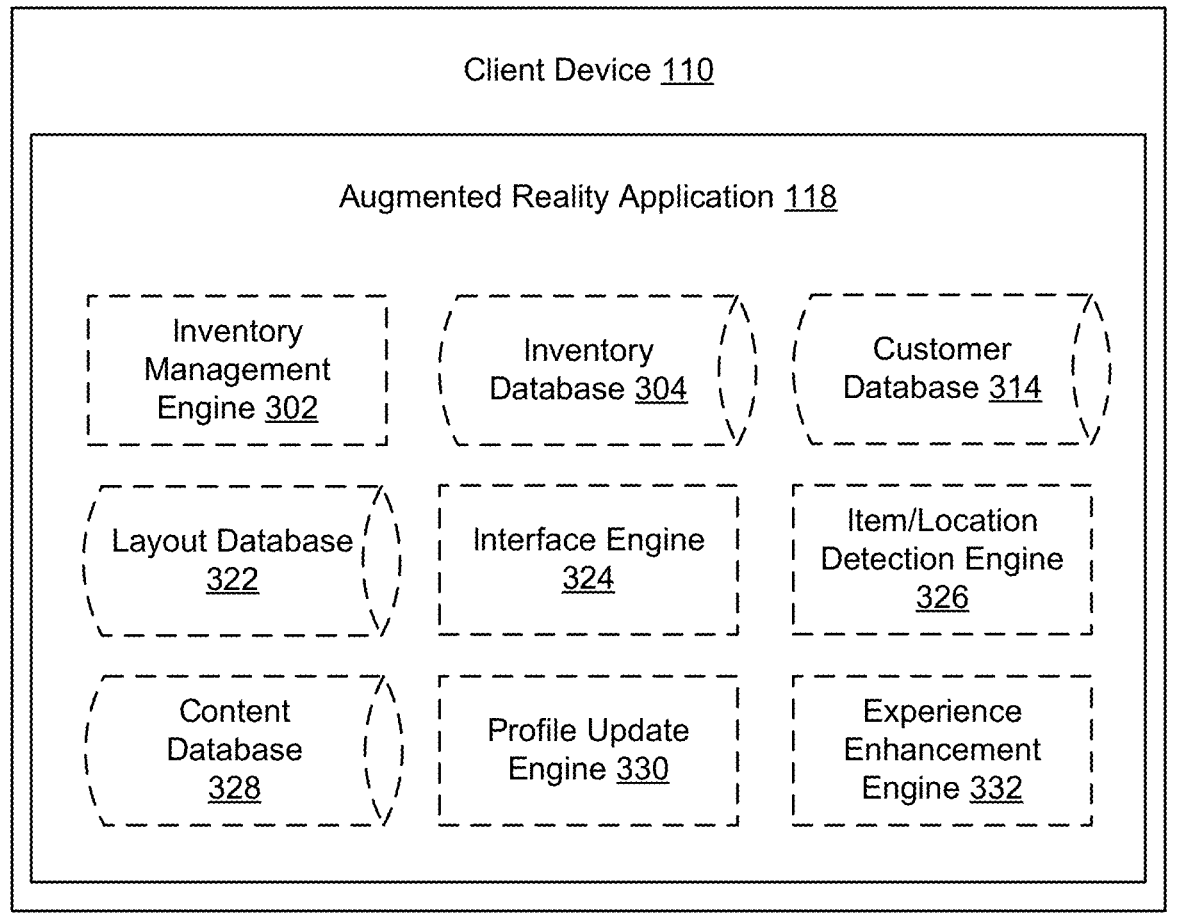
FIG. 3B is a diagram of an augmented reality application, according to one or more embodiments.

FIG. 3B is a diagram of an augmented reality application 118, according to one embodiment. In various embodiments, the augmented reality application 118 may include different or additional modules than those described in conjunction with FIG. 3B. Furthermore, in some embodiments, the augmented reality application 118 includes fewer modules than those described in conjunction with FIG. 3B.

The components of the augmented reality application 118 illustrated in FIG. 3B function in the same manner described above in conjunction with FIG. 3A. As described above, the augmented reality application 118 displays an augmented reality element that provides a personalized enhanced experience at a warehouse 210. As also described above, the augmented reality application 118 may be executed on a client device 110 associated with a shopper 208 fulfilling an order on behalf of a customer 204 or a client device 110 associated with a customer 204 of a retailer associated with a warehouse 210, in which the customer 204 may or may not be associated with the online concierge system 102. Furthermore, in various embodiments, one or more components of the augmented reality application 118 may interact with one or more components of the online concierge system 102, the CMA 206, and/or the SMA 212, while in other embodiments, the augmented reality application 118 is a standalone application.

Customer Mobile Application

Figure 4A:
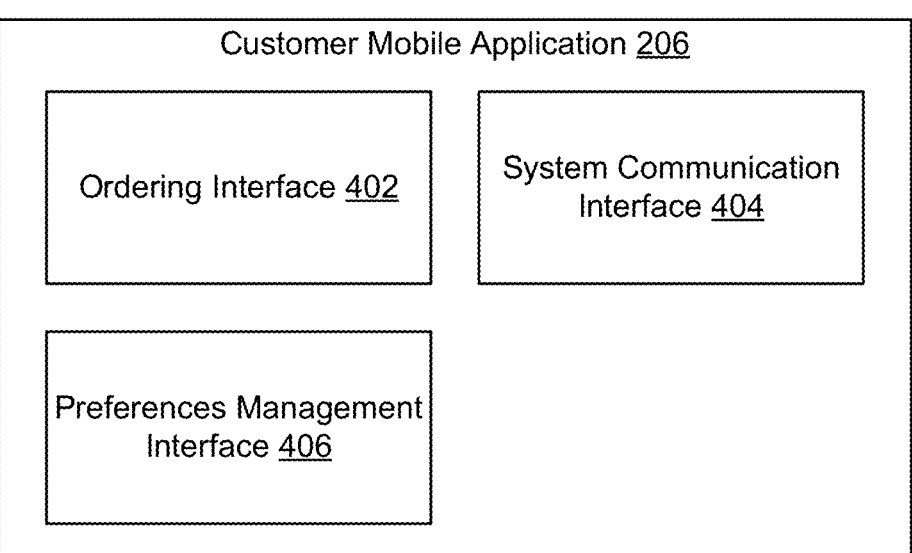
FIG. 4A is a diagram of a customer mobile application (CMA), according to one or more embodiments.

FIG. 4A is a diagram of the customer mobile application (CMA) 206, according to one or more embodiments. The CMA 206 includes an ordering interface 402, which provides an interactive interface which a customer 204 may use to browse through and select products and place an order. The CMA 206 also includes a system communication interface 404 which, among other functions, receives inventory information from the online concierge system 102 and transmits order information to the system 102. The CMA 206 also includes a preferences management interface 406 which allows a customer 204 to manage basic information associated with his/her account, such as his/her home address and payment instruments. The preferences management interface 406 may also allow a customer 204 to manage other details such as his/her favorite or preferred warehouses 210, preferred delivery times, special instructions for delivery, and so on.

Shopper Mobile Application

Figure 4B:
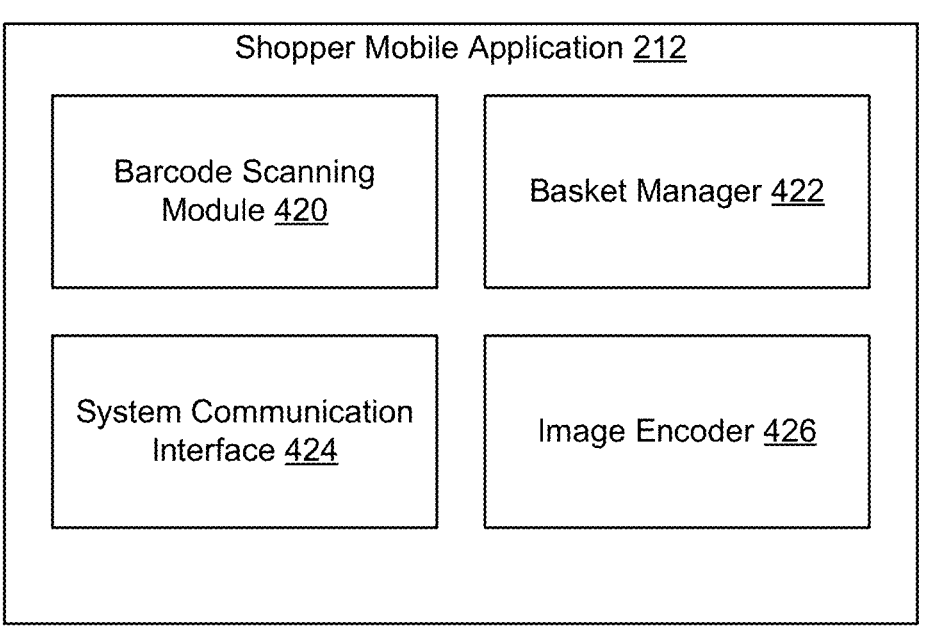
FIG. 4B is a diagram of a shopper mobile application (SMA), according to one or more embodiments.

FIG. 4B is a diagram of the shopper mobile application (SMA) 212, according to one or more embodiments. The SMA 212 includes a barcode scanning module 420, which allows a shopper 208 to scan an item at a warehouse 210 (such as a can of soup on the shelf at a grocery store). The barcode scanning module 420 may also include an interface, which allows a shopper 208 to manually enter information describing an item (such as its serial number, SKU, quantity and/or weight) if a barcode is not available to be scanned. The SMA 212 also includes a basket manager 422, which maintains a running record of items collected by a shopper 208 for purchase at a warehouse 210. This running record of items is commonly known as a "basket." In one embodiment, the barcode scanning module 420 transmits information describing each item (such as its cost, quantity, weight, etc.) to the basket manager 422, which updates its basket accordingly. The SMA 212 also includes a system communication interface 424, which interacts with the online concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code, which may then be scanned by an employee of a warehouse 210 at check-out.

Displaying an Augmented Reality Element That Provides a Personalized Enhanced Experience at a Warehouse FIG. 5 is a flowchart of a method for displaying an augmented reality element that provides a personalized enhanced experience at a warehouse 210, according to one or more embodiments. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the augmented reality application 118 and/or the online concierge system 102 in various embodiments, while in other embodiments, the steps of the method are performed by any application and/or any online system capable of retrieving items.

In various embodiments, the user of the client device 110 described below is a shopper 208 associated with the online concierge system 102 fulfilling an order on behalf of a customer 204, while in other embodiments, the user is a customer 204 of the retailer associated with the warehouse 210, who may or may not be associated with the online concierge system 102. Therefore, in some embodiments, "customer 204" may refer to a user of the online concierge system 102 who has placed an order to be fulfilled by a shopper 208, while in other embodiments, "customer 204" may refer to the user of the client device 110 who is doing their own shopping at the warehouse 210.

In some embodiments, the augmented reality application 118 or the online concierge system 102 may receive 505 information identifying a warehouse 210 (e.g., a physical grocery store) at which a client device 110 (e.g., an augmented reality device or a mobile device) is located, in which the warehouse 210 is associated with a retailer and multiple items included among an inventory of the warehouse 210. In various embodiments, the augmented reality application 118 or the online concierge system 102 may receive 505 the information identifying the warehouse 210 from the client device 110 via GPS triangulation, cell tower triangulation, Wi-Fi positioning, or any other suitable technique. For example, if the client device 110 is at the warehouse 210, the augmented reality application 118 or the online concierge system 102 may track the location of the client device 110 (e.g., via GPS triangulation), access information describing the locations of various warehouses 210 (e.g., stored in the layout database 322 or a warehouse database), and identify the warehouse 210 based on the location of the client device 110. In embodiments in which the user of the client device 110 is a shopper 208 fulfilling an order on behalf of the customer 204, the online concierge system 102 may identify the warehouse 210 at which the order is to be fulfilled (e.g., using the shopper management engine 310). In such embodiments, the online concierge system 102 may then communicate information identifying the warehouse 210 to the augmented reality application 118.

In some embodiments, the augmented reality application 118 or the online concierge system 102 also or alternatively may receive 505 the information identifying the warehouse 210 via an interface that the augmented reality application 118 or the online concierge system 102 generates and transmits (e.g., using the interface engine 324). In such embodiments, the interface may include one or more fields, buttons, or other interactive elements for receiving various inputs from the user of the client device 110. For example, if the user of the client device 110 is at the warehouse 210, the user may select an option to share the location of the client device 110 by clicking on a button included in the interface. Alternatively, in the above example, the user may select the warehouse 210 from a drop-down menu included in the interface or type a name of the retailer associated with the warehouse 210 into a search box included in the interface and select the warehouse 210 from a list of results.

In various embodiments, the augmented reality application 118 or the online concierge system 102 also may receive 510 information identifying one or more items ("target items") included among the inventory of the warehouse 210 to be collected from the warehouse 210 by the user of the client device 110. The target items may correspond to one or more items included in an order or a shopping list. In some embodiments, the augmented reality application 118 or the online concierge system 102 may receive 510 the information identifying the target items in an input from the user of the client device 110 via the interface described above. In such embodiments, upon receiving the input from the user via the interface, the augmented reality application 118 or the online concierge system 102 may retrieve information identifying items included among the inventory of the warehouse 210 based on the input (e.g., items having attributes with values that match at least a portion of the input identified by leveraging item embeddings). Via the interface, one or more items may then be added to a list of target items (e.g., a shopping list) or subsequently removed from the list. For example, the interface may include a search box that allows the user to type in a name of an item, a description of an item, etc. In this example, the user may add one or more items included in a list of results to a list of target items and search for additional items to add to the list of target items. In embodiments in which the user of the client device 110 is a shopper 208 fulfilling an order on behalf of the customer 204, the online concierge system 102 may receive 510 information identifying the target items included in the order (e.g., via the order fulfillment engine 306). In such embodiments, the online concierge system 102 may then communicate information identifying the target items to the augmented reality application 118.

In some embodiments, the augmented reality application 118 or the online concierge system 102 then accesses 515 (e.g., using the interface engine 324) a layout of the warehouse 210 (e.g., from the layout database 322). In embodiments in which layouts of multiple warehouses 210 are maintained (e.g., in the layout database 322), the layout of the warehouse 210 accessed 515 by the augmented reality application 118 or the online concierge system 102 may be identified based on the information identifying the warehouse 210 received 505 by the methods described above. In some embodiments, the layout of the warehouse 210 may be received from the retailer associated with the warehouse 210 and updated by the retailer. The layout of the warehouse 210 may be stored in association with information that uniquely identifies the warehouse 210, such as a name of the warehouse 210, a geographic location of the warehouse 210, etc. For example, the layout of the warehouse 210 may be stored in association with GPS coordinates associated with the warehouse 210, a combination of a name of the retailer associated with the warehouse 210 and a city and state in which the warehouse 210 is located, etc.

The layout of the warehouse 210 may describe departments and/or physical elements within the warehouse 210, such as organizational elements, including aisles, shelves within the aisles, various display areas (e.g., frozen or refrigerated display cases, display tables, and sample and promotional displays), etc., as well as their arrangement within the warehouse 210. In addition to organizational elements, the layout of the warehouse 210 also may describe additional physical elements within the warehouse 210, such as items included among the inventory of the warehouse 210, service counters (e.g., for various departments and/or checkout counters), and various building elements (e.g. entrances/exits, floors, ceilings, walls, stairs, elevators, etc.), and their arrangement within the warehouse 210. The layout of the warehouse 210 also may include one or more images of departments and physical elements within the warehouse 210 captured from one or more angles, positions, etc.

Additionally, the layout of the warehouse 210 may describe a set of locations within the warehouse 210 associated with each item included among its inventory. A location within the warehouse 210 associated with an item may correspond to a particular area within the warehouse 210 at which the item may be collected. For example, the layout of the warehouse 210 may describe one or more locations within the warehouse 210 associated with an item, in which each location corresponds to a particular aisle, a particular shelf, a particular display table, a particular promotional display, etc., at which the item may be collected.

The augmented reality application 118 or the online concierge system 102 then receives 520 (e.g., via the interface engine 324) image or video data captured by a camera of the client device 110, in which the image or video data includes a display area of the client device 110. For example, if the client device 110 is a smartphone, the camera of the smartphone may capture image or video data that is visible within the display area of the smartphone to the user of the smartphone. Alternatively, in the above example, if the client device 110 is a pair of augmented reality glasses, the camera of the augmented reality glasses may capture image or video data that is visible to the user wearing the augmented reality glasses. In the above example, the image or video data may depict various physical elements within the warehouse 210, such as items included among the inventory of the warehouse 210, service counters (e.g., for various departments and/or checkout counters), organizational elements (e.g., aisles, shelves, display areas, etc.), and various building elements (e.g. entrances/exits, floors, ceilings, walls, stairs, elevators, etc.).

The augmented reality application 118 or the online concierge system 102 then detects 525 (e.g., via the item/location detection engine 326) a set of items included among the inventory of the warehouse 210 within the display area of the client device 110. The set of items may be detected 525 based on the received 520 image or video data and one or more images of each item (e.g., one or more images of items included in a catalog stored in the inventory database 304). For example, suppose that the image or video data depicts a physical element, such as a box of cereal, displayed within the display area of the client device 110. In this example, the augmented reality application 118 or the online concierge system 102 may access images of items included in a catalog (e.g., stored in the inventory database 304) and compare the depiction to the images of the items included in the catalog. In the above example, the augmented reality application 118 or the online concierge system 102 may detect 525 the box of cereal if the depiction has at least a threshold measure of similarity to one or more images of the box of cereal included in the catalog.

In some embodiments, the augmented reality application 118 or the online concierge system 102 may detect 525 the set of items using a machine learning model. For example, the augmented reality application 118 or the online concierge system 102 may provide the image or video data as an input to a machine learning model that is trained using images of various items included among the inventory of the warehouse 210 (e.g., stored in the inventory database 304). The augmented reality application 118 or the online concierge system 102 may then receive an output from the model describing predicted likelihoods that each item is detected 525 in the image or video data and determine that an item is detected 525 if the corresponding predicted likelihood is at least a threshold likelihood.

In various embodiments, the augmented reality application 118 or the online concierge system 102 also or alternatively may detect 525 (e.g., via the item/location detection engine 326) a set of physical elements (e.g., advertisements, coupons, shopping carts, etc.) within the display area of the client device 110. In such embodiments, the augmented reality application 118 or the online concierge system 102 may do so in a manner analogous to that described above. For example, the augmented reality application 118 or the online concierge system 102 may detect 525 the set of physical elements based on images of the physical elements (e.g., stored in the layout database 322, the content database 328, etc.) or using a machine learning model trained using the images.

In some embodiments, the augmented reality application 118 or the online concierge system 102 also may detect (e.g., using the item/location detection engine 326) that the set of items is being held by the user of the client device 110 (e.g., based on the position of the set of items relative to the user's hands). The augmented reality application 118 or the online concierge system 102 may do so using various techniques, such as machine learning/object detection, depth perception, infrared/thermal imaging, or any other suitable technique or combination of techniques. For example, suppose that the client device 110 includes multiple infrared cameras, such that the client device 110 is capable of receiving depth perception information and heat-related information about the set of items detected 525 within the display area of the client device 110 and other physical elements detected 525 within the display area. In this example, the augmented reality application 118 or the online concierge system 102 may detect that the set of items is being held if the set of items and a hand holding the set of items are moving together in directions and/or at speeds that are different from all or most other physical elements detected 525 within the display area. In the above example, the augmented reality application 118 or the online concierge system 102 also may detect that the set of items is being held if depth perception information indicates that the set of items and hand are closer to the client device 110 than the other physical elements and if heat-related information indicates that the set of items and hand emit different amounts of heat.

The augmented reality application 118 or the online concierge system 102 then accesses 530 (e.g., via the experience enhancement engine 332) a set of attributes of each item included among the set of items (e.g., from the inventory database 304). Examples of attributes of an item include qualitative and/or quantitative information about the item, including size, color, weight, SKU, serial number, type, variety, ingredients, brand, manufacturer, cost, one or more dimensions, quantity, quality, manufacturing location, nutritional information, one or more packaging materials, or any other suitable attributes of an item. For example, if the set of items includes a carton of milk, attributes of the carton of milk may include its type (e.g., cow milk, goat milk, soy milk, oat milk, almond milk, etc.), size (e.g., one gallon, half gallon, one quart, etc.), variety (e.g., fat-free, low fat, lactose-free, etc.), and brand/manufacturer.

In embodiments in which the augmented reality application 118 or the online concierge system 102 detects 525 a set of physical elements within the warehouse 210, the augmented reality application 118 or the online concierge system 102 may access 530 (e.g., via the experience enhancement engine 332) a set of attributes of each physical element (e.g., from the inventory database 304, the layout database 322, the content database 328, etc.). In embodiments in which the set of physical elements includes one or more content items, attributes of each content item may include a type associated with the content item (e.g., coupon, advertisement, recipe, etc.), information identifying one or more items associated with the content item, attributes of each item associated with the content item, one or more dates associated with the content item (e.g., an expiration date associated with a coupon or offer), a type of data included in the content item (e.g., image data, video data, text data, etc.), or any other suitable types of information. For example, if the set of physical elements includes a coupon for an item, attributes of the coupon may include information describing a discount offered, an expiration date, information identifying the item, attributes of the item associated with the coupon (e.g., stored in the inventory database 304), exclusions, limits, or other restrictions, etc.

The augmented reality application 118 or the online concierge system 102 then retrieves 535 (e.g., via the experience enhancement engine 332) profile information associated with the customer 204 (e.g., from the customer database 314). In embodiments in which the user of the client device 110 is a shopper 208 fulfilling an order on behalf of the customer 204, the profile information associated with the customer 204 may be retrieved 535 based on details associated with the order identifying the customer 204 (e.g., stored in the transaction records database 308 or the training datasets 320). The profile information associated with the customer 204 may include the customer's name, address, gender, preferences, favorite items, stored payment instruments, order history, etc. The profile information may describe one or more preferences of the customer 204 for items having various attributes. Preferences for items may describe types, qualities, quantities, colors, sizes, brands, manufacturing locations, ingredients, packaging, or any other attributes of items. For example, the profile information may describe a preference of the customer 204 for certain types of milk (e.g., oat and soy). As an additional example, the profile information may describe a preference of the customer 204 for a particular brand of coffee creamer and a minimum number of days between an expiration date and a current date for dairy items.

In some embodiments, the preferences included among the profile information associated with the customer 204 also may include the customer's dislike for items having various attributes and/or a set of restrictions associated with the customer 204. For example, if the customer 204 is allergic to peanuts, the preferences included among the profile information may indicate that the customer 204 has a dietary restriction related to peanuts and is therefore unlikely to be interested in food items including peanuts as an ingredient. As an additional example, if the customer 204 previously reported a problem with a delivery order, in which organic blueberries requested by the customer 204 were unavailable and were replaced with non-organic blueberries and the customer 204 indicated that the replacement item was a poor replacement, the preferences included among the profile information may indicate that the customer 204 dislikes non-organic blueberries.

The profile information associated with the customer 204 also may include the customer's order and/or purchase history and/or one or more lists of items (e.g., shopping lists) associated with the customer 204. Information describing an order/purchase included in the customer's order/purchase history may include a date and time of the order/purchase, information describing items included in the order/purchase, a price of each item included in the order/purchase, a total cost of the order/purchase, a warehouse 210 at which the order/purchase was fulfilled/completed, coupons, discounts, or other promotions applied to the order/purchase, or any other information that may be associated with an order/purchase. In embodiments in which the profile information associated with the customer 204 includes one or more lists of items associated with the customer 204, each list may include one or more items specified by the customer 204. Each list of items associated with the customer 204 may be created by the customer 204 using the interface described above. Similar to each order/purchase included in an order/purchase history, information describing a list of items may include a date the list was created, information describing items included in the list, information identifying a warehouse 210 at which items on the list were collected, or any other suitable types of information that may be associated with a list of items.

In various embodiments, the profile information associated with the customer 204 also may include one or more goals associated with the customer 204. A goal associated with the customer 204 may describe the customer's personal goals (e.g., health goals, nutritional goals, etc.). For example, the profile information associated with the customer 204 may describe goals of the customer 204 to lose weight, increase protein intake, and eat fewer processed foods. As an additional example, the profile information associated with the customer 204 may describe a goal of saving money on groceries.

In some embodiments, the retrieved 535 profile information associated with the customer 204 may be updated by the augmented reality application 118 or the online concierge system 102 (e.g., using the profile update engine 330). In such embodiments, the preferences associated with the customer 204 may be updated based on other profile information associated with the customer 204. For example, suppose that the profile information associated with the customer 204 indicates that the customer 204 has a goal of losing weight by following a particular diet. In this example, the preferences associated with the customer 204 may be updated to indicate that the customer 204 has a preference for food items that may be consumed when on the diet (e.g., foods low in sugar and saturated fat) and a dislike for food items that are to be avoided when on the diet (e.g., foods high in sugar and saturated fat).

In some embodiments, the profile information associated with the customer 204 also may include information describing one or more augmented reality elements sent to the display area of one or more client devices 110 associated with the customer 204. In such embodiments, each augmented reality element may have been sent to a display area of a client device 110 used by the customer 204 or to a display area of a client device 110 used by a shopper 208 while the shopper 208 was fulfilling an order on behalf of the customer 204. Information describing an augmented reality element sent to a display area of a client device 110 associated with the customer 204 may describe a function of the augmented reality element (e.g., to call attention to an item, to promote an item, to compare items, etc.) and identify one or more items or other physical elements to which the augmented reality element was directed. The information also may identify one or more content items included in the augmented reality element (e.g., a coupon, a recipe, a video, etc.) and a date and time that the augmented reality element was sent to a display area of a client device 110 associated with the customer 204.

The augmented reality application 118 or the online concierge system 102 then matches 540 (e.g., using the experience enhancement engine 332) profile information associated with the customer 204 with one or more attributes of each item included among the set of items. For example, if the set of preferences included among the profile information associated with the customer 204 indicates that the customer 204 prefers foods that are low in sugar, the augmented reality application 118 or the online concierge system 102 may match 540 this preference with an attribute of each item corresponding to its sugar content. As an additional example, suppose that a package of tofu is included among the set of items detected 525 within the display area of the client device 110 and an attribute of the item accessed 530 by the augmented reality application 118 or the online concierge system 102 is a soy ingredient. In this example, if a dietary restriction included among the set of preferences associated with the customer 204 indicates that the customer 204 is allergic to soy, the augmented reality application 118 or the online concierge system 102 may match 540 the attribute of the item with the dietary restriction.

As described above, in some embodiments, the augmented reality application 118 or the online concierge system 102 detects 525 a set of physical elements within the warehouse 210 and accesses 530 a set of attributes of each physical element. In such embodiments, the augmented reality application 118 or the online concierge system 102 also may match 540 (e.g., using the experience enhancement engine 332) profile information associated with the customer 204 with one or more attributes of each physical element included among the set of physical elements. For example, suppose that an advertisement for a can of coconut milk is detected 525 within the display area of the client device 110 and attributes of the advertisement include nutritional information associated with the can of coconut milk (e.g., stored in the inventory database 304) corresponding to 13 grams of saturated fat. In this example, if a dietary restriction associated with the customer 204 indicates that the customer 204 is on a diet that prohibits saturated fat, the augmented reality application 118 or the online concierge system 102 may match 540 the attribute with the dietary restriction.

The augmented reality application 118 or the online concierge system 102 then generates 545 (e.g., using the interface engine 324) one or more augmented reality elements based on the profile information associated with the customer 204 matched 540 with the attributes of each item included among the set of items. The augmented reality elements may be configured to perform various functions with respect to the set of items, including calling attention to the set of items and/or one or more attributes of the set of items, obscuring the set of items, comparing the set of items, recommending a set of replacement items, and promoting the set of items. In embodiments in which the profile information associated with the customer 204 is matched 540 with one or more attributes of each physical element included among the set of physical elements, one or more augmented reality elements also may be generated 545 based on the match. In such embodiments, the augmented reality elements may be configured to perform the same functions described above with respect to the set of physical elements. Furthermore, in embodiments in which the augmented reality application 118 or the online concierge system 102 receives 510 information identifying the target items, an augmented reality element configured to present a list of the target items, such as a shopping list, also may be generated.

In various embodiments, the augmented reality application 118 or the online concierge system 102 may generate 545 the augmented reality elements based on additional types of information as well. In some embodiments, this information may include inferences made by the augmented reality application 118 or the online concierge system 102, information describing replacement items identified by the augmented reality application 118 or the online concierge system 102, and/or other information associated with the customer 204 that matches one or more attributes of the set of items and/or the set of physical elements. In various embodiments, this information also may include information the augmented reality application 118 or the online concierge system 102 accesses from various databases (e.g., the inventory database 304, the customer database 314, the content database 328, etc.).

In some embodiments, the augmented reality application 118 or the online concierge system 102 may infer (e.g., using the experience enhancement engine 332) an intent of the user of the client device 110 based on information it has detected (e.g., using the item/location detection engine 326). For example, if the augmented reality application 118 or the online concierge system 102 detects that the user of the client device 110 is holding an item included among the set of items or if the item has been detected 525 within the display area of the client device 110 for at least a threshold amount of time, the augmented reality application 118 or the online concierge system 102 may infer that the user is thinking about purchasing the item. In this example, the augmented reality application 118 or the online concierge system 102 may retrieve promotional content, such as a coupon and an advertisement associated with the item (e.g., from the content database 328), which it may use to then generate 545 an augmented reality element that promotes the item by including the promotional content. Alternatively, in the above example, the augmented reality application 118 or the online concierge system 102 may retrieve a set of content (e.g., from the content database 328) describing how the item may be used (e.g., a recipe that includes the item as an ingredient) and generate 545 an augmented reality element that promotes the item by including the content. As an additional example, if the augmented reality application 118 or the online concierge system 102 detects that the user of the client device 110 is holding two or more items included among the set of items or if the items have been detected 525 within the display area of the client device 110 for at least a threshold amount of time, the augmented reality application 118 or the online concierge system 102 may infer that the user is comparing the items. In this example, the augmented reality application 118 or the online concierge system 102 may then generate 545 an augmented reality element that compares the items based on the inference and attributes of each item.

In embodiments in which the augmented reality application 118 or the online concierge system 102 receives 510 information identifying the target items, the augmented reality application 118 or the online concierge system 102 also may infer (e.g., using the experience enhancement engine 332) an intent of the customer 204 based on the target items and one or more content items (e.g., recipes stored in the content database 328). In such embodiments, the augmented reality application 118 or the online concierge system 102 may then generate 545 an augmented reality element based on the inference and any information related to the inference (e.g., retrieved from the inventory database 304, the content database 328, etc.). For example, suppose that two items (e.g., graham crackers and marshmallows) that are ingredients in a popular recipe (e.g., stored in the content database 328) that calls for three ingredients are included among the target items. In this example, if the last ingredient (e.g., chocolate) is not included among the target items, the augmented reality application 118 or the online concierge system 102 may infer that the customer 204 is likely to purchase this item as well and may generate 545 an augmented reality element recommending the item based on the inference and information describing the item (e.g., retrieved from the inventory database 304).

As described above, the augmented reality application 118 or the online concierge system 102 may generate 545 the augmented reality elements based on information stored in one or more databases (e.g., the inventory database 304, the content database 328, etc.). In such embodiments, the augmented reality application 118 or the online concierge system 102 may identify (e.g., using the experience enhancement engine 332) the information based on profile information associated with the customer 204 describing augmented reality elements sent to display areas of client devices 110 associated with the customer 204 and a purchase history of the customer 204. For example, the profile information associated with the customer 204 may indicate that the customer 204 was much more likely to purchase items within a threshold amount of time after augmented reality elements including coupons associated with the items were sent to a display area of a client device 110 associated with the customer 204 than after augmented reality elements including other types of content were sent to a display area of a client device 110 associated with the customer 204. In the above example, based on the profile information, the augmented reality application 118 or the online concierge system 102 may be more likely to generate 545 an augmented reality element that includes coupons than other types of content.

In some embodiments, the augmented reality application 118 or the online concierge system 102 also may use a machine learning model to identify information used to generate 545 the augmented reality elements. For example, the augmented reality application 118 or the online concierge system 102 may provide the profile information associated with the customer 204 and information identifying the set of items as an input to a machine learning model. In this example, the model may be trained using profile information associated with customers 204 stored in the customer database 314 (e.g., information describing augmented reality elements previously sent to display areas of client devices 110 associated with the customers 204, preferences associated with the customers 204, order/purchase histories associated with the customers 204, etc.) and content stored in the content database 328. Continuing with this example, the augmented reality application 118 or the online concierge system 102 may then receive an output from the model describing predicted likelihoods that the customer 204 will purchase the set of items after an augmented reality element that may be generated 545 based on each content item associated with the set of items is sent to the display area of the client device 110. In the above example, the augmented reality application 118 or the online concierge system 102 may identify one or more content items associated with the highest predicted likelihoods.

Once the augmented reality elements are generated 545, the augmented reality application 118 or the online concierge system 102 sends (e.g., using the interface engine 324) the augmented reality elements to the display area of the client device 110. In some embodiments, the augmented reality application 118 or the online concierge system 102 may store (e.g., using the interface engine 324) information describing the augmented reality elements sent to the client device 110 (e.g., in the customer database 314), such that this information is included among the profile information associated with the customer 204. For example, suppose that the augmented reality application 118 or the online concierge system 102 sends an augmented reality element to the display area of the client device 110, in which the augmented reality element promotes the set of items and includes a content item (e.g., a coupon) associated with the set of items. In this example, information describing the augmented reality element (e.g., information indicating that it promoted the set of items, information identifying the set of items and the content item, etc.) and a date and time that it was sent to the display area of the client device 110 may be stored among the profile information associated with the customer 204.

The augmented reality elements are then displayed 550 in the display area of the client device 110, such that each augmented reality element is overlaid onto a portion of the display area of the client device 110. The augmented reality elements may be overlaid onto one or more portions of the display area of the client device 110 based on one or more locations within the display area at which the set of items (or the set of physical elements, in various embodiments) is detected 525. For example, an augmented reality element may be overlaid onto a portion of the display area of the client device 110 at which an item included among the set of items is detected 525. Alternatively, in the above example, the augmented reality element may be overlaid onto another portion of the display area, such that it appears to float in a corner of the display area or near the item detected 525 within the display area. In various embodiments, as the set of items (or the set of physical elements, in various embodiments) detected 525 within the display area of the client device 110 move within the display area, the augmented reality elements may move as well. For example, if an augmented reality element calls attention to an item included among the set of items, as the item moves within the display area of the client device 110, the augmented reality element may move as well, such that it tracks the movement of the item. In some embodiments, the augmented reality elements may be hidden by the user of the client device 110, such that the augmented reality elements are not visible within the display area of the client device 110. For example, the user of the client device 110 may switch between different modes via the interface described above, such that in one mode, all types of augmented reality elements are visible within the display area of the client device 110, in another mode, only certain types of augmented reality elements (e.g., those including shopping lists) are visible, and in yet another mode, none of the types of augmented reality elements are visible.

Figure 6A:
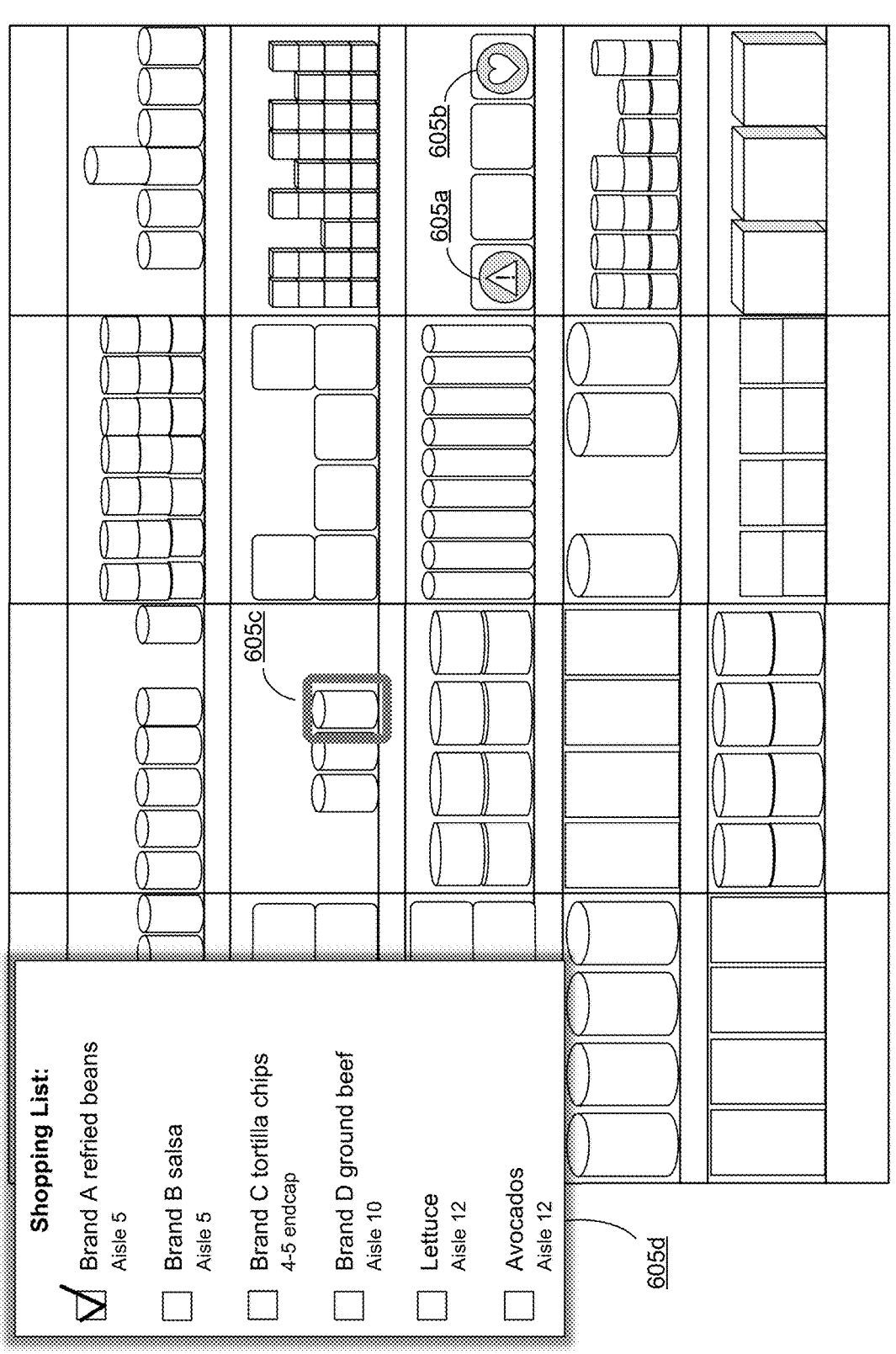
FIG. 6A illustrates a set of augmented reality elements configured to call attention to a set of items within a warehouse, according to one or more embodiments.

In embodiments in which the augmented reality application 118 or the online concierge system 102 generates 545 an augmented reality element that calls attention to an item included among the set of items, the augmented reality element may call attention to the item by highlighting it (e.g., with one or more colors) or with icons (e.g., arrows or circles), animations, etc. For example, an augmented reality element may call attention to an item detected 525 within the display area of the client device 110 by encircling a portion of the display area at which the item is detected 525 with a colored halo. An augmented reality element may call attention to an item for various reasons (e.g., if the item is included in an order or a shopping list, if one or more attributes of the item match 540 profile information associated with the customer 204, etc.). For example, as shown in FIG. 6A, which illustrates a set of augmented reality elements configured to call attention to a set of items within a warehouse 210, according to one or more embodiments, suppose that the set of preferences associated with the customer 204 includes a dietary restriction indicating that the customer 204 is allergic to pineapple. In this example, an augmented reality element 605a may call attention to an item that contains pineapple with a warning icon that hovers over or near a portion of the display area of the client device 110 at which the item is detected 525. In this example, if the set of preferences associated with the customer 204 also indicates that the customer 204 likes strawberries, another augmented reality element 605b may call attention to strawberry-flavored candy with a heart icon that hovers over or near a portion of the display area of the client device 110 at which the item is detected 525. As shown in FIG. 6A, an augmented reality element 605c also may call attention to an item that is a target item by encircling a portion of the display area of the client device 110 at which the item is detected 525 with a colored halo. In some embodiments, the user of the client device 110 may adjust one or more settings to change an appearance of an augmented reality element 605 that calls attention to an item (e.g., by changing one or more colors of highlights, by changing the style of icons or animations, etc.) via the interface described above.

In embodiments in which the augmented reality application 118 or the online concierge system 102 generates 545 an augmented reality element 605 that calls attention to an attribute of an item (e.g., size, variety, brand, etc.) included among the set of items, the augmented reality element 605 may call attention to the attribute by highlighting it or with icons, animations, etc. An augmented reality element 605 may call attention to an attribute of an item for various reasons (e.g., if an item having the attribute is a target item, if the attribute matches 540 the profile information associated with the customer 204, etc.). For example, suppose that the profile information associated with the customer 204 indicates that the customer 204 is allergic to soy and the augmented reality application 118 or the online concierge system 102 detects that the user of the client device 110 is holding an item that contains soy. In this example, the augmented reality application 118 or the online concierge system 102 may infer that the user is thinking about purchasing the item and may match 540 the soy ingredient with the profile information indicating the customer 204 is allergic to soy. Continuing with this example, based on the inference, the augmented reality application 118 or the online concierge system 102 may generate 545 an augmented reality element 605 that calls attention to the word "soy" in a list of ingredients on the item detected 525 within the display area of the client device 110 with a warning icon and by encircling a portion of the display area in which the word is detected 525 with a red halo. As an additional example, if an item (e.g., ground coffee) is a target item, an augmented reality element 605 may call attention to information describing an attribute of the item (e.g., the word "ground" on the item) detected 525 within the display area of the client device 110 by encircling a portion of the display area in which the information is detected 525 with a green halo. In various embodiments, multiple augmented reality elements 605 may call attention to different attributes by highlighting them differently (e.g., with different colors) or with different icons, different animations, etc. In the above example, if another item (e.g., whole bean coffee) is not a target item, another augmented reality element 605 may call attention to information describing an attribute of the item (e.g., the word "whole bean" on the item) detected 525 within the display area of the client device 110 by encircling a portion of the display area in which the information is detected 525 with a red halo. In some embodiments, the user of the client device 110 may adjust one or more settings to change an appearance of an augmented reality element 605 that calls attention to an attribute of an item (e.g., by changing one or more colors of highlights, by changing the style of icons or animations, etc.) via the interface described above.

Figure 6B:
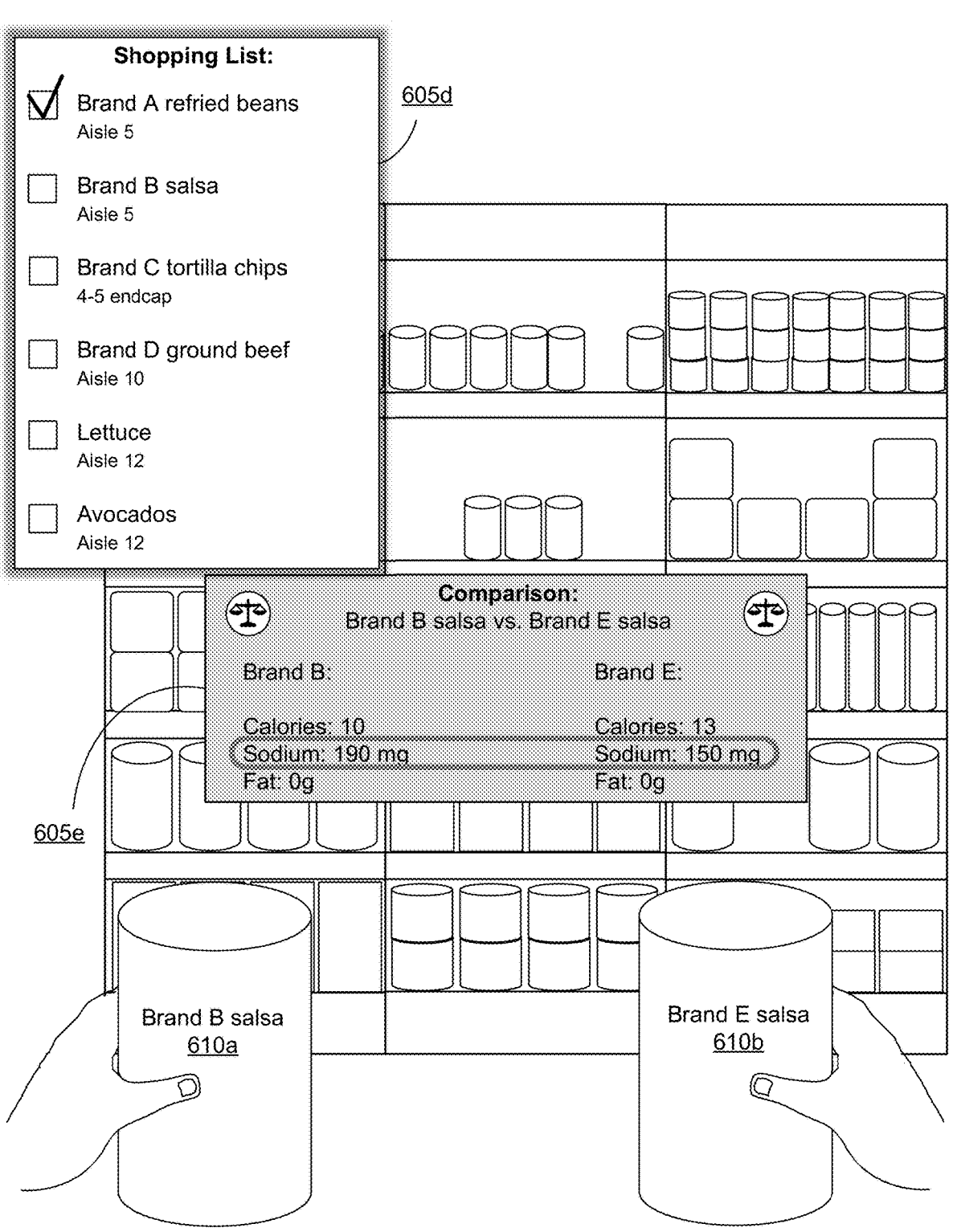
FIG. 6B illustrates a set of augmented reality elements configured to compare a set of items within a warehouse, according to one or more embodiments.

In embodiments in which the augmented reality application 118 or the online concierge system 102 generates 545 an augmented reality element 605 that compares items included among the set of items, the augmented reality element 605 may include statistics associated with each item or other values of one or more attributes of each item. An augmented reality element 605 may compare two or more items for various reasons (e.g., if the user of the client device 110 is holding the items, if the items are detected 525 within the display area of the client device 110 for at least a threshold amount of time, etc.). For example, as shown in FIG. 6B, which illustrates a set of augmented reality elements 605 configured to compare a set of items within a warehouse 210, according to one or more embodiments, an augmented reality element 605e generated 545 by the augmented reality application 118 or the online concierge system 102 compares a can of Brand B salsa 610a to a can of Brand E salsa 610b being held by the user of the client device 110. In this example, the augmented reality element 605e includes side-by-side statistics associated with the can of Brand B salsa 610a and the can of Brand E salsa 610b, including their calorie counts, sodium content, and fat content. Furthermore, an augmented reality element 605 that compares items may highlight certain statistics, such as statistics related to the profile information associated with the customer 204 that match 540 one or more attributes of the items. In the above example, if the customer 204 is on a diet that limits their sodium intake, the augmented reality element 605e may highlight the sodium content of the can of Brand B salsa 610a and the can of Brand E salsa 610b, as shown in FIG. 6B. In embodiments in which the client device 110 is associated with a shopper 208 fulfilling an order on behalf of the customer 204, the shopper 208 may communicate the comparison to the customer 204. In some embodiments, the user of the client device 110 may adjust one or more settings to change an augmented reality element 605 that compares items, such as how statistics or other values are displayed 550 (e.g., numerically in a table or graphically in a chart), by changing the types of values displayed 550, etc. via the interface described above.

In embodiments in which the augmented reality application 118 or the online concierge system 102 generates 545 an augmented reality element 605 that recommends an item included among the set of items, the augmented reality element 605 may include information associated with the item (e.g., brand, type, size, nutritional information, price, discounts or coupons that may apply to the item, etc.) and a reason the item is being recommended. An item may be recommended if the customer 204 is likely to purchase it (e.g., based on their order/purchase history or other profile information, the target items, etc.), if the customer 204 is likely to prefer it to another item (e.g., another item the customer 204 is considering purchasing), etc. For example, suppose that a roll of paper towels is included among the set of items detected 525 by the augmented reality application 118 or the online concierge system 102. In this example, suppose also that attributes of the roll of paper towels (e.g., stored in the inventory database 304) indicate a brand, an item type, and a size associated with the paper towels and the profile information associated with the customer 204 includes an order history that indicates the customer 204 orders the roll of paper towels with the corresponding attributes about once every month. In the above example, if the customer 204 has not ordered the roll of paper towels with the corresponding attributes in about a month, the augmented reality application 118 or the online concierge system 102 may match 540 the attributes with the order history. Continuing with this example, based on the match, the augmented reality application 118 or the online concierge system 102 may generate 545 an augmented reality element 605 that recommends the roll of paper towels (e.g., with a "Buy it again" heading) when overlaid onto the display area of the client device 110.

Figure 6C:
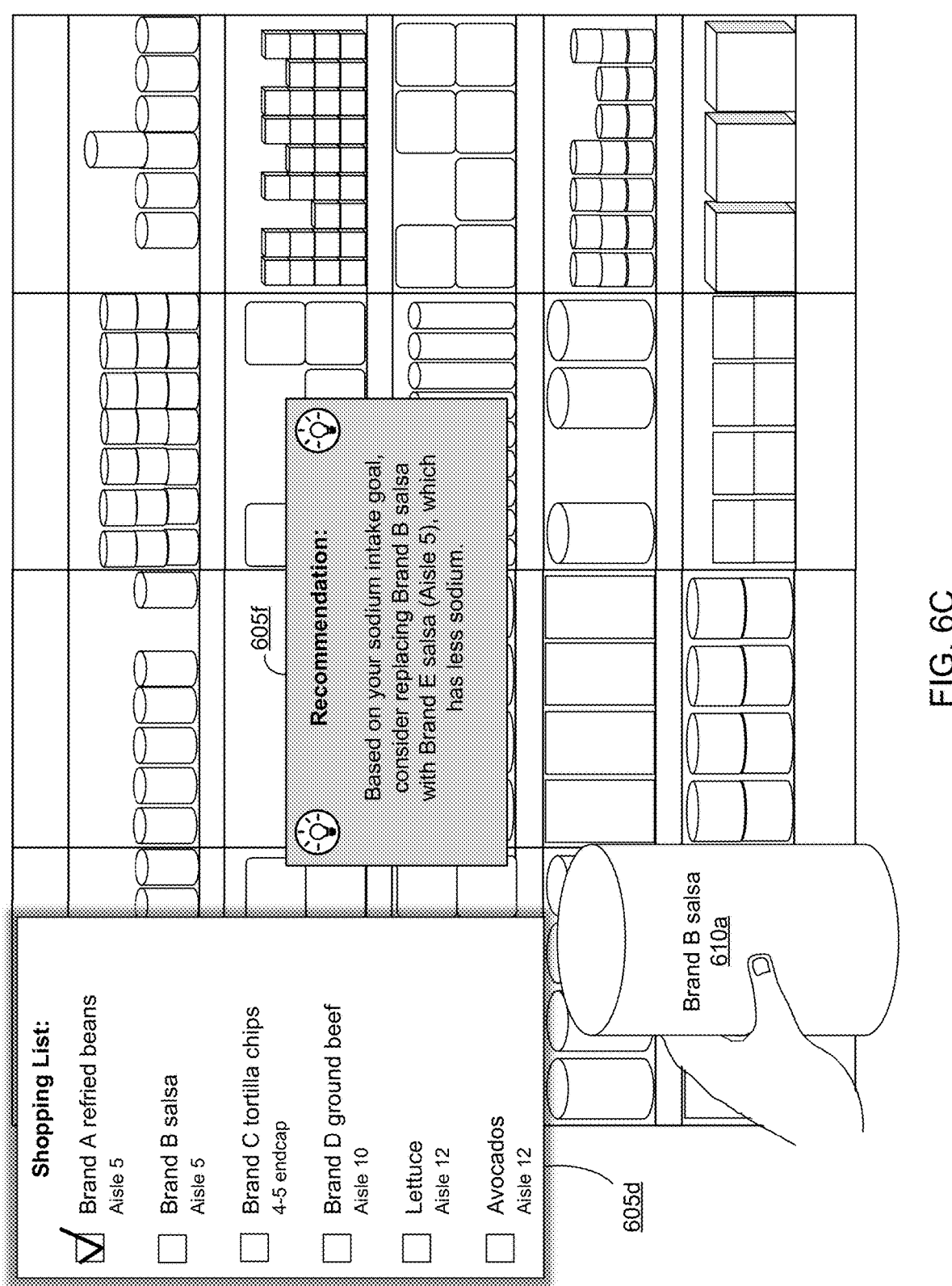
FIG. 6C illustrates a set of augmented reality elements configured to recommend a set of replacement items within a warehouse, according to one or more embodiments.

An additional example of an augmented reality element 605 that recommends an item is shown in FIG. 6C, which illustrates a set of augmented reality elements 605 configured to recommend a set of replacement items within a warehouse 210, according to one or more embodiments. In this example, suppose that the augmented reality application 118 or the online concierge system 102 identifies a can of Brand E salsa as a replacement item that the customer 204 is likely to prefer to the can of Brand B salsa 610a the customer 204 is holding. Continuing with this example, an augmented reality element 605f that recommends the replacement item includes a description of the replacement item (Brand E salsa), its location in the warehouse 210 (Aisle 5), and a reason the customer 204 is likely to prefer the replacement item (it is lower in sodium, which matches 540 the customer's sodium intake goal). In embodiments in which the client device 110 is associated with a shopper 208 fulfilling an order on behalf of the customer 204, the shopper 208 may communicate the recommendation to the customer 204. In some embodiments, the user of the client device 110 may adjust one or more settings to change augmented reality elements 605 that recommend items, such as types of information about the items being recommended (e.g., unit price, item price, brand, etc.), criteria for recommending items, etc. via the interface described above.

As described above, in some embodiments, the augmented reality elements 605 may recommend a set of replacement items that the customer 204 is likely to prefer to an item included among the set of items (e.g., an item the user is holding). In such embodiments, to identify the set of replacement items, the augmented reality application 118 or the online concierge system 102 may first identify (e.g., using the experience enhancement engine 332) a set of potential replacement items having attributes that have at least a threshold measure of similarity to attributes of the item that may be replaced. The augmented reality application 118 or the online concierge system 102 may then identify (e.g., using the experience enhancement engine 332) one or more replacement items from the set of potential replacement items based on the profile information associated with the customer 204 and attributes of the set of potential replacement items. In embodiments in which multiple replacement items are recommended, an augmented reality element 605 that recommends the replacement items may list the replacement items in an order based on a ranking, as further described below.

The augmented reality application 118 or the online concierge system 102 may identify the set of potential replacement items in various ways. In some embodiments, in addition to accessing 530 a set of attributes of each item included among the set of items, the augmented reality application 118 or the online concierge system 102 also may access 530 (e.g., using the experience enhancement engine 332) a set of attributes of other items included among the inventory of the warehouse 210 (e.g., stored in the inventory database 304). In such embodiments, the augmented reality application 118 or the online concierge system 102 may then identify (e.g., using the experience enhancement engine 332) a set of potential replacement items that each have a set of attributes that have at least a threshold measure of similarity to the set of attributes of the item that may be replaced. Examples of attributes of an item include a type of the item, ingredients of the item, a brand of the item, a manufacturer of the item, a cost of the item, a size of the item, one or more dimensions of the item, a quantity of the item, a quality of the item, a manufacturing location of the item, nutritional information associated with the item, one or more materials of the item, or any other suitable attributes of an item. In various embodiments, the augmented reality application 118 or the online concierge system 102 may access a taxonomy (e.g., maintained by the inventory management engine 302) and identify the set of potential replacement items included in a most specific category in which the item that may be replaced is included.

In some embodiments, the augmented reality application 118 or the online concierge system 102 may predict (e.g., using the experience enhancement engine 332) a likelihood that the customer 204 will prefer each potential replacement item to the item that may be replaced. In such embodiments, the augmented reality application 118 or the online concierge system 102 may make the prediction based on the profile information associated with the customer 204, the attributes of the item that may be replaced, and the attributes of each potential replacement item. In some embodiments, in addition to matching 540 the profile information associated with the customer 204 with the attributes of each item included among the set of items, the augmented reality application 118 or the online concierge system 102 also may match 540 the profile information with one or more attributes of each potential replacement item. In such embodiments, the augmented reality application 118 or the online concierge system 102 may then predict a likelihood associated with each potential replacement item based on the match. For example, suppose that the user of the client device 110 is holding an item that the customer 204 has never purchased and that the only profile information associated with the customer 204 that matches 540 an attribute of the item corresponds to an item type of one or more items included in their purchase history. In this example, suppose also that the purchase history indicates that the customer 204 previously purchased a potential replacement item several times when it was on sale, such that the profile information matches (step 540) multiple attributes of the potential replacement item (e.g., its brand, type, etc. and information indicating it is on sale). In the above example, the augmented reality application 118 or the online concierge system 102 may then predict a likelihood (e.g., 85%) that the customer 204 will prefer the potential replacement item to the item the user of the client device 110 is holding based on the match.

The augmented reality application 118 or the online concierge system 102 may then identify (e.g., using the experience enhancement engine 332) one or more replacement items from the set of potential replacement items based on the predicted likelihood that the customer 204 will prefer each potential replacement item to the item that may be replaced. In some embodiments, the augmented reality application 118 or the online concierge system 102 may identify one or more replacement items associated with at least a threshold likelihood from the set of potential replacement items. Alternatively, the augmented reality application 118 or the online concierge system 102 may rank (e.g., using the experience enhancement engine 332) the set of potential replacement items based on the predicted likelihood associated with each potential replacement item and identify one or more replacement items based on the ranking (e.g., one or more replacement items associated with at least a threshold ranking).

In some embodiments, the augmented reality application 118 or the online concierge system 102 also may identify one or more replacement items using a machine learning model. For example, the augmented reality application 118 or the online concierge system 102 may provide attributes of the customer 204 as an input to a machine learning model that is trained using profile information associated with customers 204 (e.g., order/purchase histories, preferences, etc. stored in the customer database 314) and attributes of items included among the inventory of the warehouse 210 (e.g., stored in the inventory database 304). The augmented reality application 118 or the online concierge system 102 may then receive an output from the model describing predicted likelihoods that the customer 204 will purchase each item included among the inventory of the warehouse 210. In this example, the augmented reality application 118 or the online concierge system 102 may identify a potential replacement item as a replacement item if the potential replacement item is associated with a likelihood that is greater than a likelihood associated with the item that may be replaced.

Figure 6D:
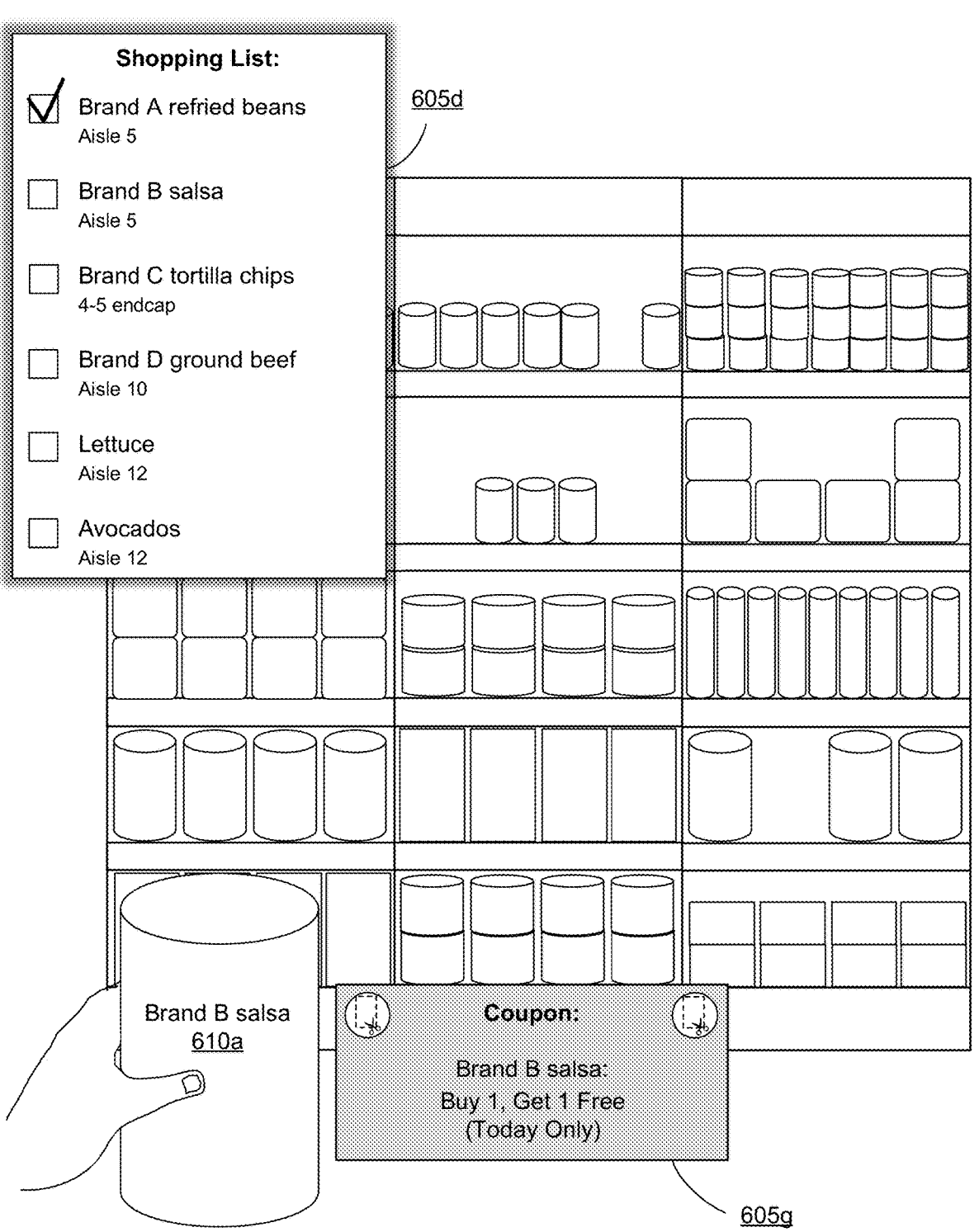
FIG. 6D illustrates a set of augmented reality elements configured to promote a set of items within a warehouse, according to one or more embodiments.

In embodiments in which the augmented reality application 118 or the online concierge system 102 generates 545 an augmented reality element 605 that promotes an item included among the set of items, the augmented reality element 605 may be generated 545 based on content associated with the item. An augmented reality element 605 may promote an item for various reasons (e.g., it is a new item, the customer 204 is considering purchasing it, it is on sale or associated with a promotion, etc.). In some embodiments, the augmented reality application 118 or the online concierge system 102 may generate 545 an augmented reality element 605 that promotes an item based on promotional content (e.g., advertisements, coupons, deals, etc.) associated with the item. For example, FIG. 6D illustrates a set of augmented reality elements 605 configured to promote a set of items within a warehouse 210, according to one or more embodiments. In this example, the augmented reality application 118 or the online concierge system 102 may generate 545 an augmented reality element 605g promoting a can of Brand B salsa 610a that the user of the client device 110 is holding, in which the augmented reality element 605g includes a buy one, get one free coupon associated with the can of Brand B salsa 610a. In various embodiments, the augmented reality application 118 or the online concierge system 102 also or alternatively may generate 545 an augmented reality element 605 that promotes an item based on content describing how the item may be used. For example, if an item is a food item, the augmented reality application 118 or the online concierge system 102 may generate 545 an augmented reality element 605 promoting the item with a recipe that includes the item as an ingredient. As an additional example, if an item is an article of clothing or an accessory, the augmented reality application 118 or the online concierge system 102 may generate 545 an augmented reality element 605 promoting the item that includes an image or a video clip of a person modeling the item.

In embodiments in which the augmented reality application 118 or the online concierge system 102 generates 545 an augmented reality element 605 that obscures an item included among the set of items, the augmented reality element 605 may obscure the item by blocking it partially or completely from view, blurring it, etc. For example, an augmented reality element 605, such as a colored rectangle or other shape that is mostly or completely opaque, may obscure an item if it is overlaid onto a portion of the display area of the client device 110 at which the item is detected 525. An augmented reality element 605 may obscure an item for various reasons (e.g., if profile information associated with the customer 204 indicates that the customer 204 dislikes the item/attributes of the item, if the profile information indicates the customer 204 has a restriction, such as a dietary restriction, associated with the item, etc.). For example, suppose that the augmented reality application 118 or the online concierge system 102 detects 525 an advertisement for an item within the display area of the client device 110 and the augmented reality application 118 or the online concierge system 102 matches 540 an attribute of the item with profile information associated with the customer 204 indicating that the customer 204 dislikes items with the attribute. In this example, the augmented reality application 118 or the online concierge system 102 may generate 545 an augmented reality element 605 that includes a coupon for a different item that does not have the attribute, in which the augmented reality element 605 may obscure the advertisement when it is overlaid onto a portion of the display area at which the advertisement is detected 525.

Figure 6E:
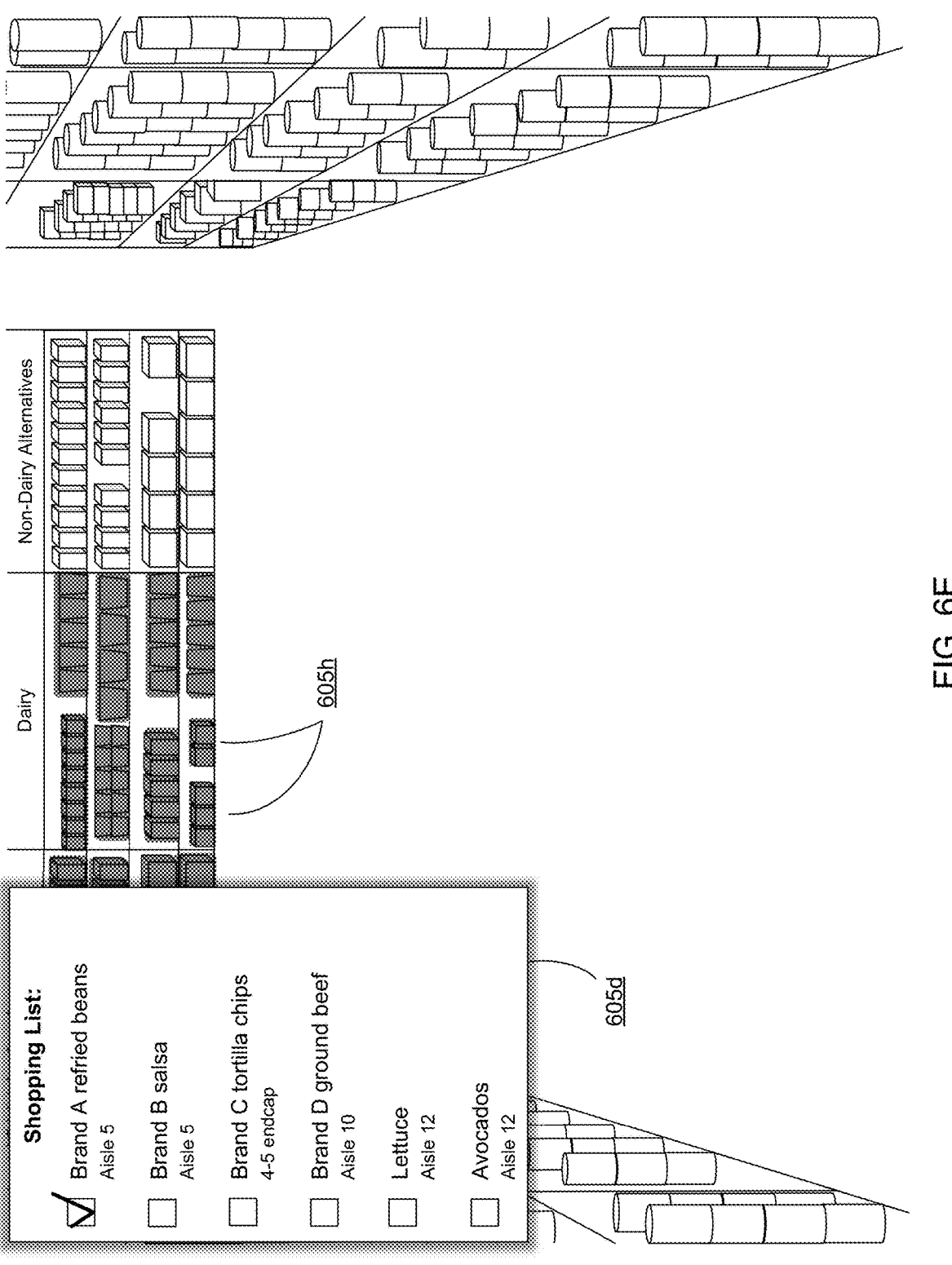
FIG. 6E illustrates a set of augmented reality elements configured to obscure a set of items within a warehouse, according to one or more embodiments.

An additional example of an augmented reality element 605 that obscures an item is shown in FIG. 6E, which illustrates a set of augmented reality elements 605 configured to obscure a set of items within a warehouse 210, according to one or more embodiments. In this example, suppose that the set of items detected 525 by the augmented reality application 118 or the online concierge system 102 includes dairy items and the augmented reality application 118 or the online concierge system 102 matches 540 a dairy attribute of the items with profile information associated with the customer 204 indicating that the customer 204 is allergic to dairy. In this example, the augmented reality application 118 or the online concierge system 102 may generate (step 545) augmented reality elements 605h that are colored rectangles, in which the augmented reality elements 605h are mostly opaque and may obscure the detected (step 525) items when they are overlaid onto portions of the display area at which the items are detected 525. In some embodiments, the user of the client device 110 may adjust one or more settings to change an augmented reality element

605 that obscures an item (e.g., by changing the method by which it obscures the item, by changing its opacity, etc.) via the interface described above.

As described above, in some embodiments, the augmented reality application 118 or the online concierge system 102 also may generate an augmented reality element 605 that is configured to present a list of the target items, such as a shopping list. In some embodiments, the list also may include information describing one or more locations within the warehouse 210 associated with the target items (e.g., locations at which the target items may be collected). In such embodiments, the augmented reality application 118 or the online concierge system 102 may generate the augmented reality element 605 based on information included in the layout of the warehouse 210 accessed 515 by the augmented reality application 118 or the online concierge system 102 describing the locations within the warehouse 210 associated with each item. For example, as shown in the examples of FIGS. 6A-6E, the augmented reality application 118 or the online concierge system 102 may generate an augmented reality element 605d including a shopping list, in which each target item is listed in association with a location within the warehouse 210 (e.g., an aisle number, an endcap identifier, etc.) at which the corresponding target item may be collected.

In some embodiments, if the augmented reality application 118 or the online concierge system 102 generates an augmented reality element 605 that includes a list of the target items, the augmented reality element 605 may be updated (e.g., using the interface engine 324). In such embodiments, the augmented reality application 118 or the online concierge system 102 may update the augmented reality element 605 as each target item is collected, if a target item is added to or removed from the list, etc. For example, as each item included in a shopping list is collected, the augmented reality application 118 or the online concierge system 102 may update an augmented reality element 605 that includes the shopping list (e.g., by checking a checkbox next to each collected item, by crossing each collected item off the list, by removing each collected item from the list, etc.). Furthermore, the augmented reality application 118 or the online concierge system 102 may update the augmented reality element 605 automatically or in response to receiving an input from the user of the client device 110 via the interface described above. In embodiments in which the augmented reality application 118 or the online concierge system 102 automatically updates the augmented reality element 605, the augmented reality element 605 may be updated when the augmented reality application 118 or the online concierge system 102 detects (e.g., using the item/location detection engine 326) that a target item has been collected. For example, if the augmented reality application 118 or the online concierge system 102 detects 525 a target item and a shopping basket being held by the user of the client device 110, the augmented reality application 118 or the online concierge system 102 also may detect that the target item is within the shopping basket. In this example, an augmented reality element 605 that lists the target item may be updated by checking a checkbox next to the target item.

Additional Considerations

The foregoing description of the embodiments of the invention has been presented for the purpose of illustration; it is not intended to be exhaustive or to limit the invention to the precise forms disclosed. Many modifications and variations are possible in light of the above disclosure.

Some portions of this description describe the embodiments of the invention in terms of algorithms and symbolic representations of operations on information. These algorithmic descriptions and representations are commonly used in the data processing arts to convey the substance of their work effectively to others. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, performed by a computer system having one or more processors, the method comprising:
    receiving, from an application executing on a client device, video data captured by a camera of the client device, wherein the video data comprises a display area of the client device;
    detecting, based on the video data, a set of items within the display area of the client device;
    detecting, based on the video data, that a user is holding at least two items of the set of items;

accessing, from an inventory database, a set of attributes of each item of the at least two items of the set of items;

processing, by the one or more processors, values of corresponding attributes from the set of attributes of the at least two items, the processing comprising comparing the values of corresponding attributes from the set of attributes of the at least two items to determine a comparison result;

generating, based on the comparison result, a comparison element that visually distinguishes an attribute value of at least one of the at least two items that the user is holding in the display area of the client device, wherein generating the comparison element further comprises:

accessing an additional set of attributes of each potential replacement item of a plurality of potential replacement items included among the inventory of a warehouse;

predicting a likelihood that the user will prefer each potential replacement item of the plurality of potential replacement items to the set of items based on the set of attributes of each item of the at least two items, and the additional set of attributes of each potential replacement item of the plurality of potential replacement items;

ranking the plurality of potential replacement items based at least in part on the predicted likelihood associated with each potential replacement item of the plurality of potential replacement items;

identifying a replacement item based at least in part on the ranking; and generating the comparison element, wherein the comparison element is configured to display the identified replacement item; and displaying the comparison element in the display area of the client device.

2. The method of claim 1, wherein detecting, based on the video data, the set of items within the display area of the client device comprises:

providing the video data to a machine learning model that is trained to output a likelihood that the video data contains the set of items;

comparing the likelihood output from the machine learning model to a threshold; and detecting the set of items based on the likelihood being above the threshold.

3. The method of claim 1, wherein detecting, based on the video data, that a user is holding at least two items of the set of items comprises:

providing the video data to a machine learning model that is trained to output a likelihood that the user is holding at least two items;

comparing the likelihood output from the machine learning model to a threshold; and detecting that the user is holding the at least two items based on the likelihood being above the threshold.

4. The method of claim 1, wherein the comparison element is configured to call attention to one or more attributes of the set of items.

5. The method of claim 1, wherein the comparison element is configured to compare the set of items and the comparison element comprises a set of statistics associated with each item of the set of items.

6. The method of claim 1, further comprising:

retrieving profile information associated with the user, wherein the profile information comprises a set of preferences associated with the user; and matching one or more of the set of preferences associated with the user with one or more of the set of attributes of each item of the at least two items of the set of items.

7. The method of claim 6, wherein generating the comparison element further comprises generating the comparison element based at least in part on the one or more of the set of preferences associated with the user that are matched with the one or more of the set of attributes of each item of the at least two items of the set of items.

8. The method of claim 6, wherein the set of preferences associated with the user comprises one or more of: a set of restrictions associated with the user and a set of dislikes associated with the user.

9. The method of claim 8, wherein the set of restrictions associated with the user comprises a set of dietary restrictions.

10. The method of claim 6, wherein the profile information associated with the user comprises one or more of: an order history associated with the user, one or more goals associated with the user, or one or more lists of one or more items included among the inventory identified by the user.

11. A computer program product comprising a non-transitory computer readable storage medium having instructions encoded thereon that, when executed by one or more processors, cause the processor to perform steps comprising:

receiving, from an application executing on a client device, video data captured by a camera of the client device, wherein the video data comprises a display area of the client device;

detecting, based on the video data, a set of items within the display area of the client device;

detecting, based on the video data, that a user is holding at least two items of the set of items;

accessing, from an inventory database, a set of attributes of each item of the at least two items of the set of items;

processing, by the one or more processors, values of corresponding attributes from the set of attributes of the at least two items, the processing comprising comparing the values of corresponding attributes from the set of attributes of the at least two items to determine a comparison result;

generating, based on the comparison result, a comparison element that visually distinguishes an attribute value of at least one of the at least two items that the user is holding in the display area of the client device, wherein generating the comparison element further comprises:

accessing an additional set of attributes of each potential replacement item of a plurality of potential replacement items included among the inventory of a warehouse;

predicting a likelihood that the user will prefer each potential replacement item of the plurality of potential replacement items to the set of items based on the set of attributes of each item of the at least two items, and the additional set of attributes of each potential replacement item of the plurality of potential replacement items;

ranking the plurality of potential replacement items based at least in part on the predicted likelihood associated with each potential replacement item of the plurality of potential replacement items;

identifying a replacement item based at least in part on the ranking; and generating the comparison element, wherein the comparison element is configured to display the identified replacement item; and

displaying the comparison element in the display area of the client device.

12. The computer program product of claim 11, wherein detecting, based on the video data, the set of items within the display area of the client device comprises:

providing the video data to a machine learning model that is trained to output a likelihood that the video data contains the set of items;

comparing the likelihood output from the machine learning model to a threshold; and detecting the set of items based on the likelihood being above the threshold.

13. The computer program product of claim 11, wherein detecting, based on the video data, that a user is holding at least two items of the set of items comprises:

providing the video data to a machine learning model that is trained to output a likelihood that the user is holding at least two items;

comparing the likelihood output from the machine learning model to a threshold; and detecting that the user is holding the at least two items based on the likelihood being above the threshold.

14. The computer program product of claim 11, wherein the comparison element is configured to call attention to one or more attributes of the set of items.

15. The computer program product of claim 11, wherein the comparison element is configured to compare the set of items and the comparison element comprises a set of statistics associated with each item of the set of items.

16. The computer program product of claim 11, wherein the non-transitory computer readable storage medium further includes instructions encoded thereon that, when executed by a processor, cause the processor to perform steps comprising:

retrieving profile information associated with the user, wherein the profile information comprises a set of preferences associated with the user; and matching one or more of the set of preferences associated with the user with one or more of the set of attributes of each item of the at least two items of the set of items.

17. The computer program product of claim 16, wherein generating the comparison element further comprises generating the comparison element based at least in part on the one or more of the set of preferences associated with the user that are matched with the one or more of the set of attributes of each item of the at least two items of the set of items.

18. The computer program product of claim 16, wherein the set of preferences associated with the user comprises one or more of: a set of restrictions associated with the user and a set of dislikes associated with the user.

19. The computer program product of claim 18, wherein the set of restrictions associated with the user comprises a set of dietary restrictions.

20. A computer system comprising:

one or more processors; and a non-transitory computer readable storage medium storing instructions that, when executed by the processor, perform actions comprising:

receiving, from an application executing on a client device, video data captured by a camera of the client device, wherein the video data comprises a display area of the client device;

detecting, based on the video data, a set of items within the display area of the client device;

detecting, based on the video data, that a user is holding at least two items of the set of items;

accessing, from an inventory database, a set of attributes of each item of the at least two items of the set of items;

processing, by the one or more processors, values of corresponding attributes from the set of attributes of the at least two items, the processing comprising comparing the values of corresponding attributes from the set of attributes of the at least two items to determine a comparison result;

generating, based on the comparison result, a comparison element that visually distinguishes an attribute value of at least one of the at least two items that the user is holding in the display area of the client device, wherein generating the comparison element further comprises:

accessing an additional set of attributes of each potential replacement item of a plurality of potential replacement items included among the inventory of a warehouse;

predicting a likelihood that the user will prefer each potential replacement item of the plurality of potential replacement items to the set of items based on the set of attributes of each item of the at least two items, and the additional set of attributes of each potential replacement item of the plurality of potential replacement items;

ranking the plurality of potential replacement items based at least in part on the predicted likelihood associated with each potential replacement item of the plurality of potential replacement items;

identifying a replacement item based at least in part on the ranking; and generating the comparison element, wherein the comparison element is configured to display the identified replacement item; and displaying the comparison element in the display area of the client device.

* * * * *